United States Patent [19]
Allsop et al.

[11] Patent Number: 5,456,481
[45] Date of Patent: Oct. 10, 1995

[54] MODULAR COMPOSITE BICYCLE FRAME

[75] Inventors: James D. Allsop; Michael G. Allsop, both of Bellingham, Wash.

[73] Assignee: Softride, Inc., Bellingham, Wash.

[21] Appl. No.: 209,871

[22] Filed: Mar. 11, 1994

Related U.S. Application Data

[63] Continuation-in-part of Ser. No. 947,274, Sep. 18, 1992, Pat. No. 5,415,423, which is a continuation-in-part of Ser. No. 873,878, Apr. 22, 1992, Pat. No. 5,240,268, which is a continuation of Ser. No. 589,771, Sep. 28, 1990, abandoned, which is a continuation-in-part of Ser. No. 521,130, May 9, 1990, Pat. No. 5,029,888, which is a continuation of Ser. No. 333,891, Apr. 17, 1989, Pat. No. 4,934,724.

[51] Int. Cl.$^6$ ............................................. B62K 19/02
[52] U.S. Cl. ............................... 280/281.1; 280/274
[58] Field of Search ................................ 280/281.1, 274

[56] References Cited

U.S. PATENT DOCUMENTS

| | | |
|---|---|---|
| D. 45,219 | 2/1914 | Allen . |
| D. 230,963 | 3/1974 | Bauer . |
| 631,282 | 8/1899 | Dikeman . |
| 1,580,414 | 4/1926 | Cozzolino et al. . |
| 2,244,709 | 6/1941 | Kinzel . |
| 2,493,037 | 1/1950 | Simon . |
| 2,854,249 | 9/1958 | Jaulmes . |
| 3,079,173 | 2/1963 | Hedstrom . |
| 3,121,575 | 2/1964 | Bourgi . |
| 3,722,612 | 3/1973 | Issigonis et al. . |
| 3,833,242 | 9/1974 | Thompson, Jr. . |
| 4,230,332 | 10/1980 | Porsche ................. 280/281.1 |
| 4,613,146 | 9/1986 | Sharp et al. . |
| 4,850,607 | 7/1989 | Trimble . |
| 4,900,048 | 2/1990 | Derujinsky . |
| 4,934,724 | 6/1990 | Allsop et al. . |
| 5,029,888 | 7/1991 | Allsop et al. . |

FOREIGN PATENT DOCUMENTS

| | | |
|---|---|---|
| 0130896A1 | 1/1985 | European Pat. Off. . |
| 0399075 | 11/1990 | European Pat. Off. . |
| 464371 | 4/1946 | France . |
| 2482039 | 11/1981 | France . |
| 265376 | 3/1989 | German Dem. Rep. ........ 280/281.1 |
| 336181 | 4/1921 | Germany . |
| 872322 | 3/1953 | Germany . |
| 4101998 | 7/1992 | Germany ........................ 280/281.1 |
| 286486 | 11/1990 | Japan . |
| 352342 | 7/1931 | United Kingdom . |
| 1361394 | 7/1974 | United Kingdom ............ 280/281.1 |
| 2021054 | 11/1979 | United Kingdom . |

OTHER PUBLICATIONS

1991, ZIPP 2001 material, (four-page brochure and four photographs).

*Primary Examiner*—Mitchell J. Hill
*Attorney, Agent, or Firm*—Christensen O'Connor Johnson & Kindness

[57] ABSTRACT

A bicycle (10) with a frame (12) formed of composite material is disclosed. The frame of this bicycle includes a head section or module (34) that is attached to two body units (36, 38). The body units are formed by injection molding and include outer shells and inner ribs 200. Alternatively, the body units may be formed of a urethane core with a stiffened fiberglass, carbon fibers, or like nonmetallic skin. The head section and body units are formed with bores (78, 81, 83, 90) in which sleeves and cables are seated to accommodate the installation of the other components of the bicycle to the frame. The body is further formed with a set of rearwardly extending members that form the chain stays (22) of the bicycle. Dropouts (104) are seated in recesses formed in the chain stays. The bicycle includes a front derailleur/rear brake assembly (30) with a front derailleur (134) that can be both selectively moved up and down and selectively pivoted along a lateral axis of the bicycle. A one-piece, injection-molded frame and methods of construction are also disclosed.

29 Claims, 15 Drawing Sheets

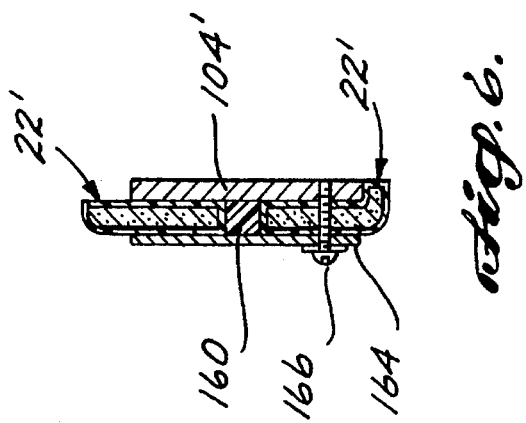
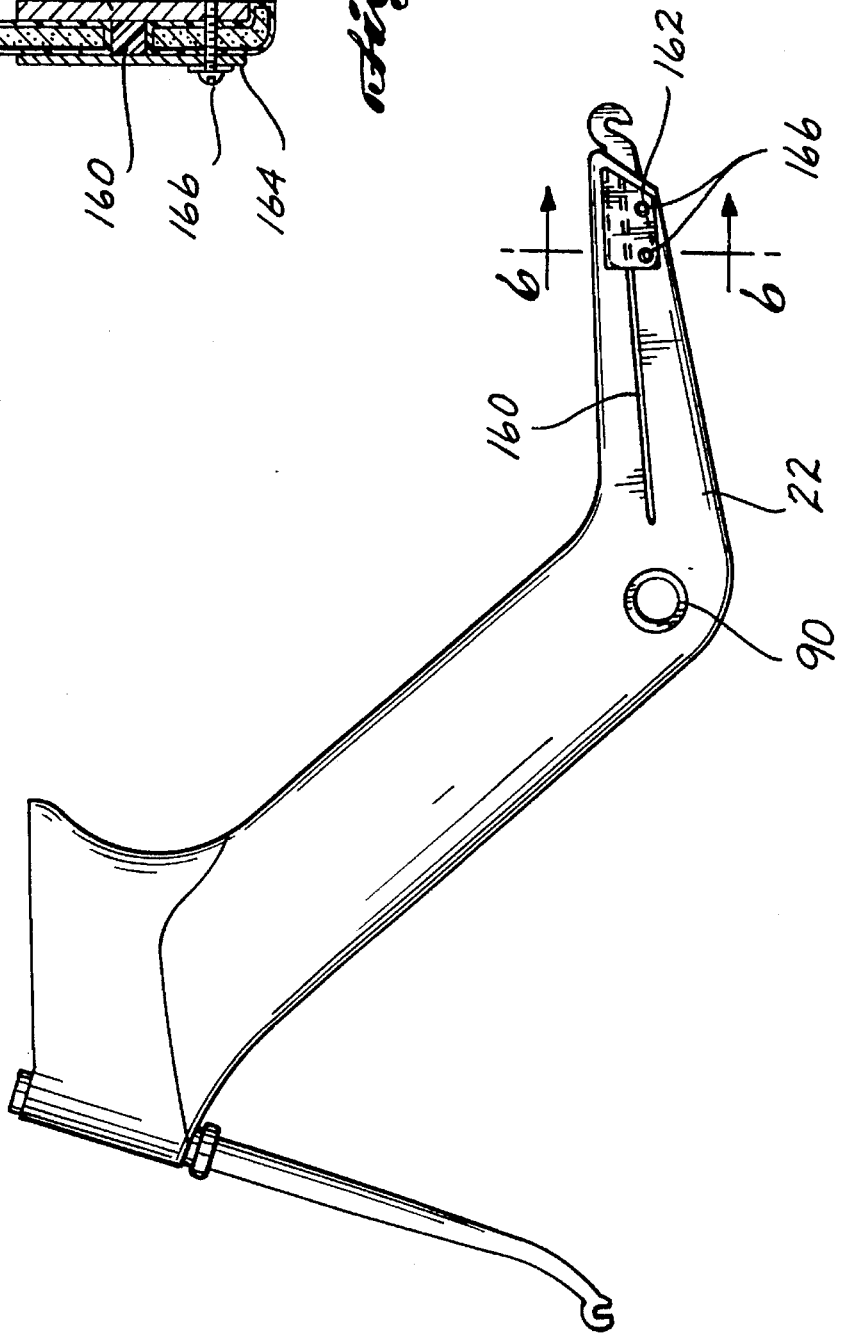

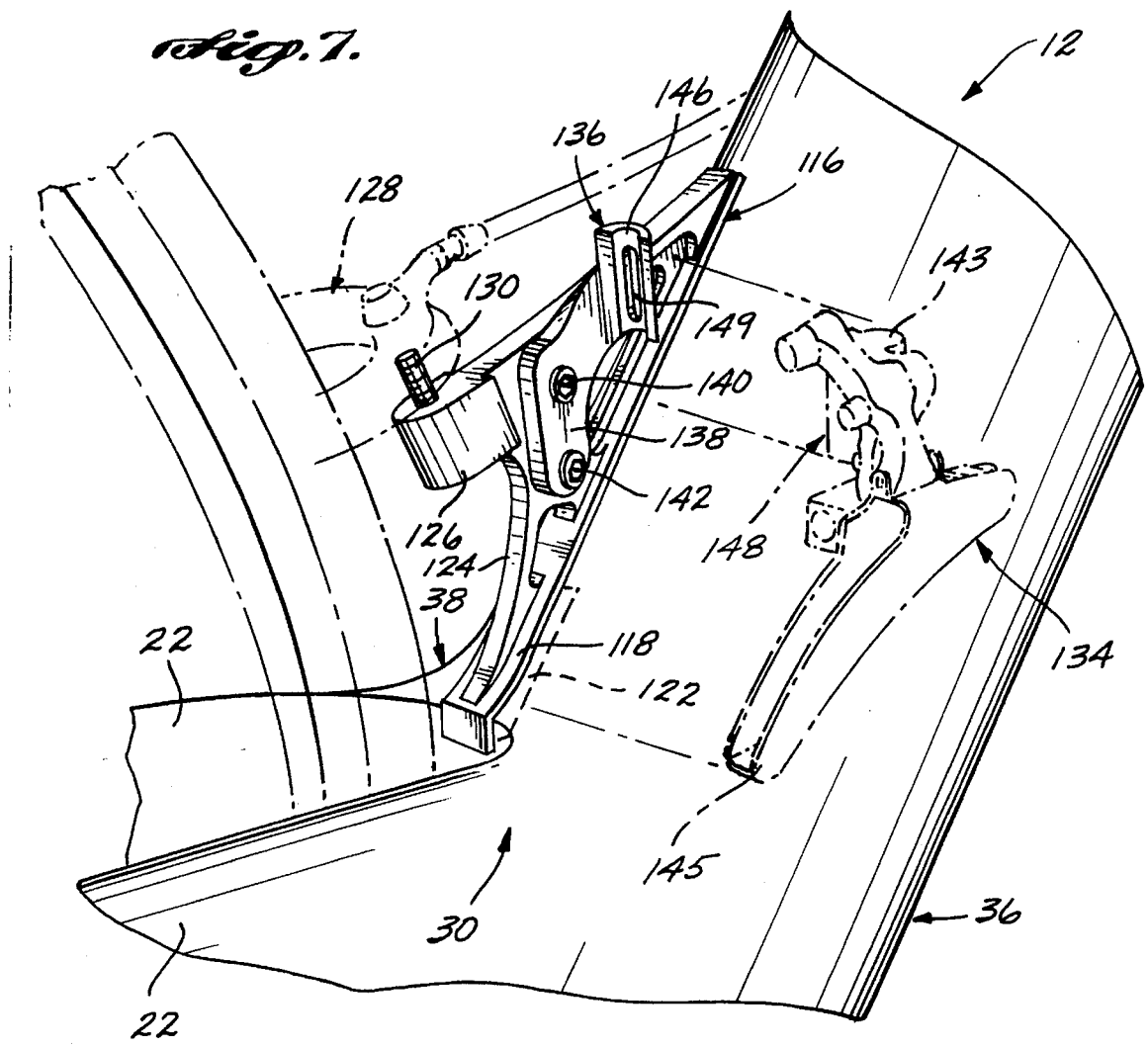

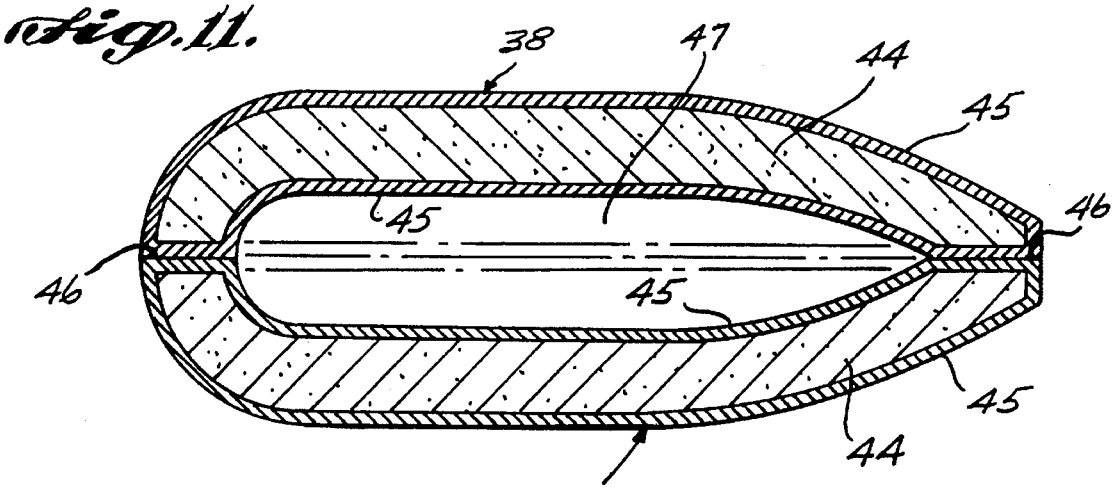
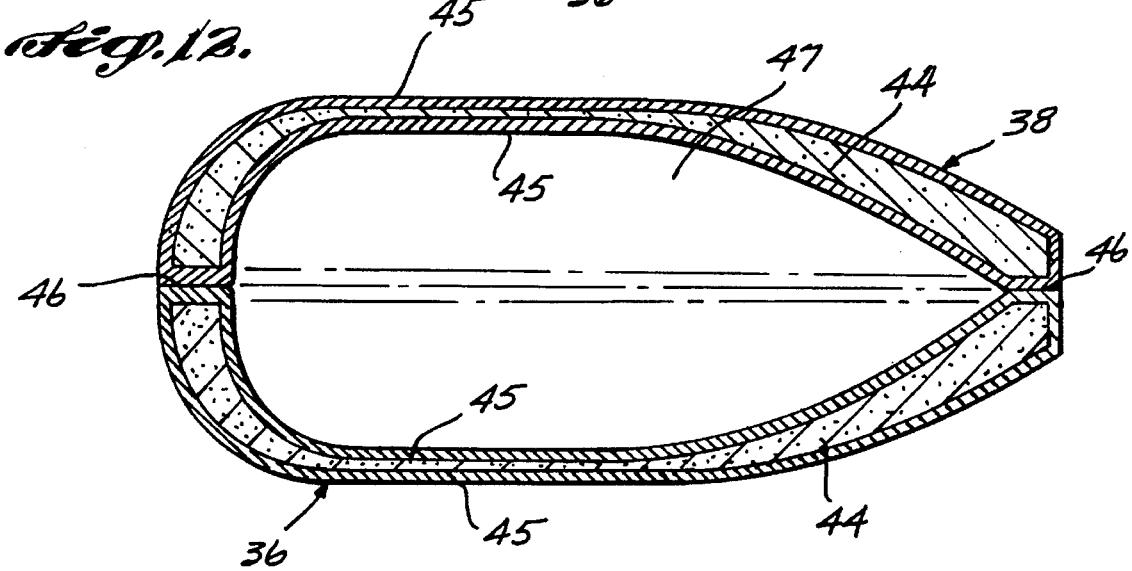
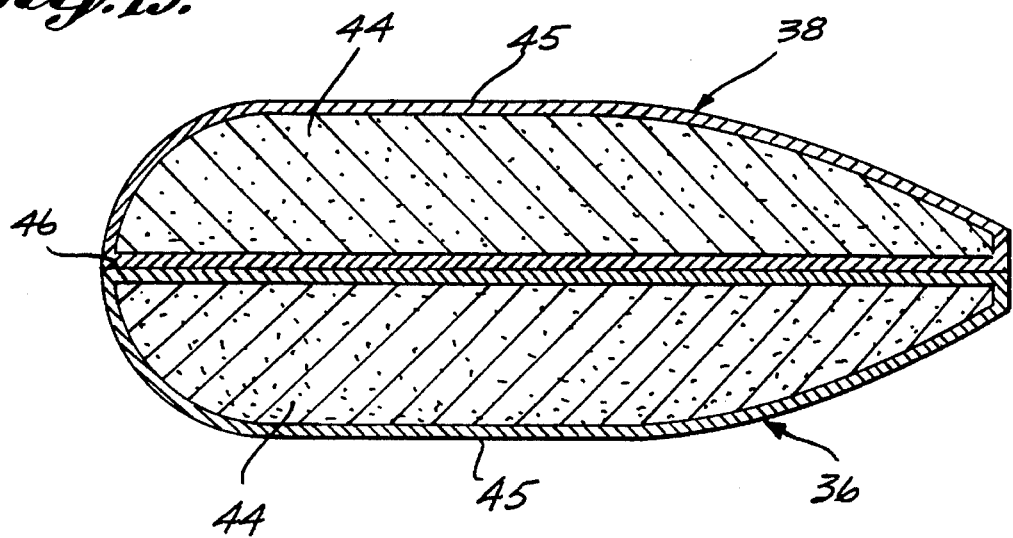

MODULAR COMPOSITE BICYCLE FRAME

RELATIONSHIP TO OTHER APPLICATIONS

This application is a continuation-in-part of application Ser. No. 07/947,274, filed Sep. 18, 1992, now U.S. Pat. No. 5,415,423, which is a continuation-in-part of application Ser. No. 07/873,878 filed Apr. 22, 1992, now U.S. Pat. No. 5,240,268. That application is a continuation of application Ser. No. 07/589,771 filed Sep. 28, 1990, now abandoned. That application was a continuation-in-part of application Ser. No. 07/521,130 filed May 9, 1990, now U.S. Pat. No. 5,029,888. That application was a continuation of application Ser. No. 07/333,891 filed Apr. 7, 1989, now U.S. Pat. No. 4,934,724.

FIELD OF THE INVENTION

This invention relates generally to bicycles and, more particularly, to a bicycle with a modular frame.

BACKGROUND OF THE INVENTION

Bicycles have proved to be very efficient vehicles for converting human energy into mechanical energy in order to produce self-propelled motion. Most bicycles include a metallic frame that comprises a set of tubes that are welded together. The wheels, the drive assembly, and the steering assembly are all mounted to the frame to complete the bicycle. Recently, there have been significant efforts to substitute frames formed of composite material for frames formed of metal. An advantage of a composite frame is that it offers as much structural strength as a metal frame and weighs significantly less. Moreover, composite frames, unlike conventional frames, do not rust and corrode when exposed to the elements. These advantages are expected to help make composite-frame bicycles very popular for use as mountain bicycles and other types of bicycles where it is desirable to have a frame with significant mechanical strength and that can withstand the rigors of contact with water, mud, rocks, and other wearing material.

Composite bicycle frames are typically formed of non-metallic material that is shaped in a mold. Owing to the expenses associated with forming the molds and the costly composite materials, it has proved very expensive to build these bicycles. It is also expensive to provide the differently sized composite frames required to build bicycles for large numbers of cyclists who are themselves of different statures. Some bicycle manufactures have attempted to overcome this problem by providing composite frames with metal fittings and fixtures that can be adjustably set to accommodate the needs of differently sized cyclists. However, this solution has not proved to be wholly satisfactory. The addition of these metal components increases the weight of the assembled bicycle, detracting from the advantages of the composite frame.

Another drawback to composite frames is their high cost necessitated by labor-intensive construction and the expensive composite materials used to provide sufficient strength. Frame strength is especially critical with negative-space bicycles, i.e., bicycles with an open or C-shaped frame that does not include a top tube, seat post tube, or frame stays. The bending and torsional forces that must be counteracted are more highly concentrated with these bicycles.

SUMMARY OF THE INVENTION

This invention relates to a bicycle with a composite frame that is easy to assemble and less expensive to manufacture. In one embodiment, the bicycle can readily be dimensioned for use by a cyclist of a particular size and shape. The bicycle of this invention includes a composite frame that is formed with a number of different sections or modules that are mated together to form the whole frame. The bicycle includes composite body units that mate together to form the frame.

The bicycle of this invention includes at least two composite body units that are preferably symmetric with respect to each other. A separate head section may also be used. If so, the separate head section can be joined to the top of the body units. In one version of the invention each body unit is formed with a urethane core and outer skin formed of a hardened material, such as cured fiberglass, a stiffened graphite fiber weave, or thermoplastic resin reinforced with fibers. Each body unit is formed with one of the chain stays of the bicycle. When the body units are mated together, the adjoining skins form one or more centered upright ribs that extend lengthwise in the central vertical plane of the frame. The rear wheel of the bicycle is mounted to a pair of dropouts, each of which is removably secured in a recess formed in one of the chain stays. The head unit is seated in the top of the body units in the three-part configuration. Mounted in the head unit is a head tube to which the front fork and handlebar assemblies of the bicycle are attached. A shock-absorbing seat support is attached to the top of the head unit adjacent the head tube. The seat support extends rearward from the head unit and provides a beam to which a bicycle seat is attached over the rear wheel.

Once the body units of this bicycle are mated together, a head unit of a desired size is joined to the body units to provide the basic frame of the bicycle with a selected height. Specifically sized dropouts may be fitted to the chain stays of the body unit to accommodate the placement of a specifically sized wheel. The bicycle is also provided with a combined front derailleur/rear brake assembly that can be positioned for differently sized crank assemblies and differently sized wheels that may be mounted to the bicycle. The seat support allows the selective forward-and-rearward positioning of the seat. The adjustability of these components makes it possible to construct a bicycle formed from a generic set of composite units or modules so that it is specifically shaped for the cyclist for whom it is intended. Thus, the bicycle of this invention eliminates the need to maintain a large number of composite frames or to have to provide those frames with a large number of metal fixtures and fittings.

Still another feature of the bicycle of the invention is that, since it does not have either a top tube or a seat post tube, it is aerodynamically more efficient than other bicycles. While this bicycle is aerodynamically more efficient than other bicycles, since it is formed of relatively strong composite materials, it is structurally as strong as, if not stronger than, other bicycles. The mechanical strength of this bicycle is enhanced by the fact that, when the body units are mated together, the inside skins of the units form one or more ribs that extend lengthwise of the frame.

Still another feature of the invention is an injection-molded modular composite frame that is simple to manufacture and assemble. The frame of this embodiment includes two body units. Each body unit includes an external shell and an internal supporting rib structure. Each body unit includes a head section, a center section, and a chain stay.

The two body units are joined together with the junction between the two units being, preferably, along a central vertical plane of the bicycle. The internal rib structure of the center section and the head section is preferably enclosed completely by the external shell.

Alternatively, the injection-molded, composite bicycle of the present invention may have a separate head section and/or a separate chain stay section.

BRIEF DESCRIPTION OF THE DRAWINGS

The invention will be pointed out with particularity in the appended claims. The above and further advantages of the invention may be better understood by reference to the following detailed description, taken in conjunction with the accompanying drawings, in which:

FIG. 5 is a side elevation of a modified frame in accordance with the present invention;

FIG. 6 is a partial vertical section along line 6—6 of FIG. 5;

FIG. 7 is a perspective view of the front derailleur and brake assembly used with the frame of this invention, with parts broken away and parts shown in phantom;

FIG. 8 is a side view of the front derailleur and rear brake assembly mount of FIG. 7;

FIG. 9 is a bottom view of the front derailleur and rear brake assembly mount of FIG. 7;

FIG. 10 is a top view of the front derailleur and rear brake assembly mount of FIG. 7;

FIG. 11 is a section along cutting plane 11 indicated in FIG. 1;

FIG. 12 is a section along cutting plane 12 indicated in FIG. 1;

FIG. 13 is a section along cutting plane 13 indicated in FIG. 1;

DETAILED DESCRIPTION OF THE PREFERRED EMBODIMENT

Figure 1:
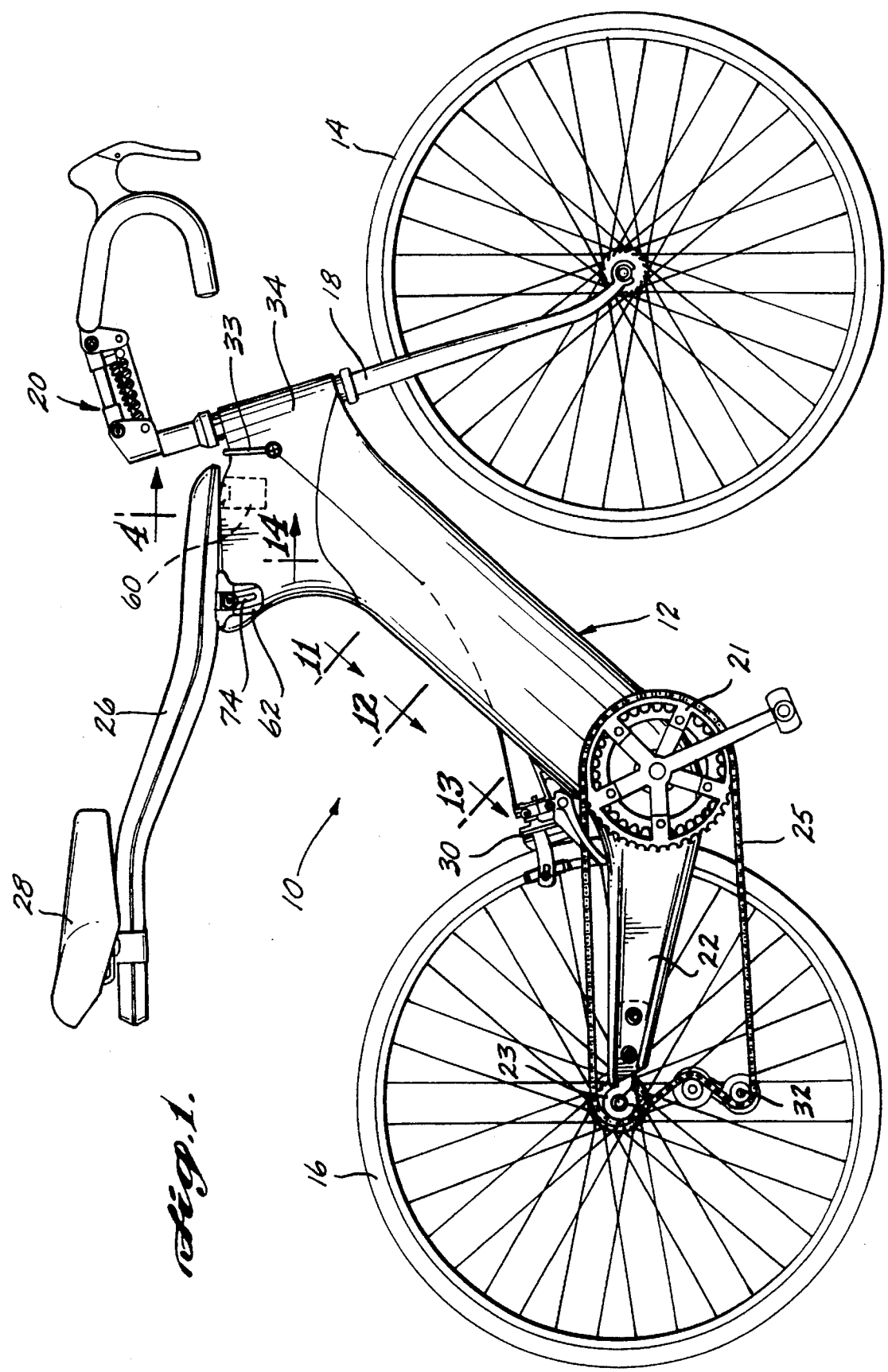
FIG. 1 is a side view of a bicycle having a frame in accordance with this invention.

FIG. 1 illustrates a bicycle 10 having a frame 12 in accordance with this invention. The bicycle frame 12 is formed of composite material to which the front wheel 14 and rear wheel 16 are attached. The front wheel 14 is attached to the frame by a front fork assembly 18, which is rotatably carried by the frame. The orientation of the front fork assembly 18 and front wheel 14 is controlled by manipulation of a top handlebar assembly 20. The rear wheel 16 is attached to a pair of chain stays 22, which are part of the frame 12. The rear wheel 16 is powered by a drivetrain that includes a crank assembly 21, which is rotatably mounted to the bottom of the frame 12, a free gear 23 that rotates with the rear wheel 16, and a chain 25 that connects the crank assembly to the free gear.

A shock-absorbing seat support 26 is attached to the top of the frame 12 adjacent and rearward of the handlebar assembly 20. The seat support 26 extends rearward and slightly upward from the top of the frame 12. A bicycle seat 28 is secured to the seat support 26 above the rear wheel 16. A combined front derailleur and rear brake assembly 30 is mounted to the frame 12 above the crank assembly 21. A rear derailleur 32 is attached to the rear wheel 16. The position of the derailleurs is established by a set of shifters 33 attached to the frame 12 adjacent the front fork assembly 18.

Figure 2:
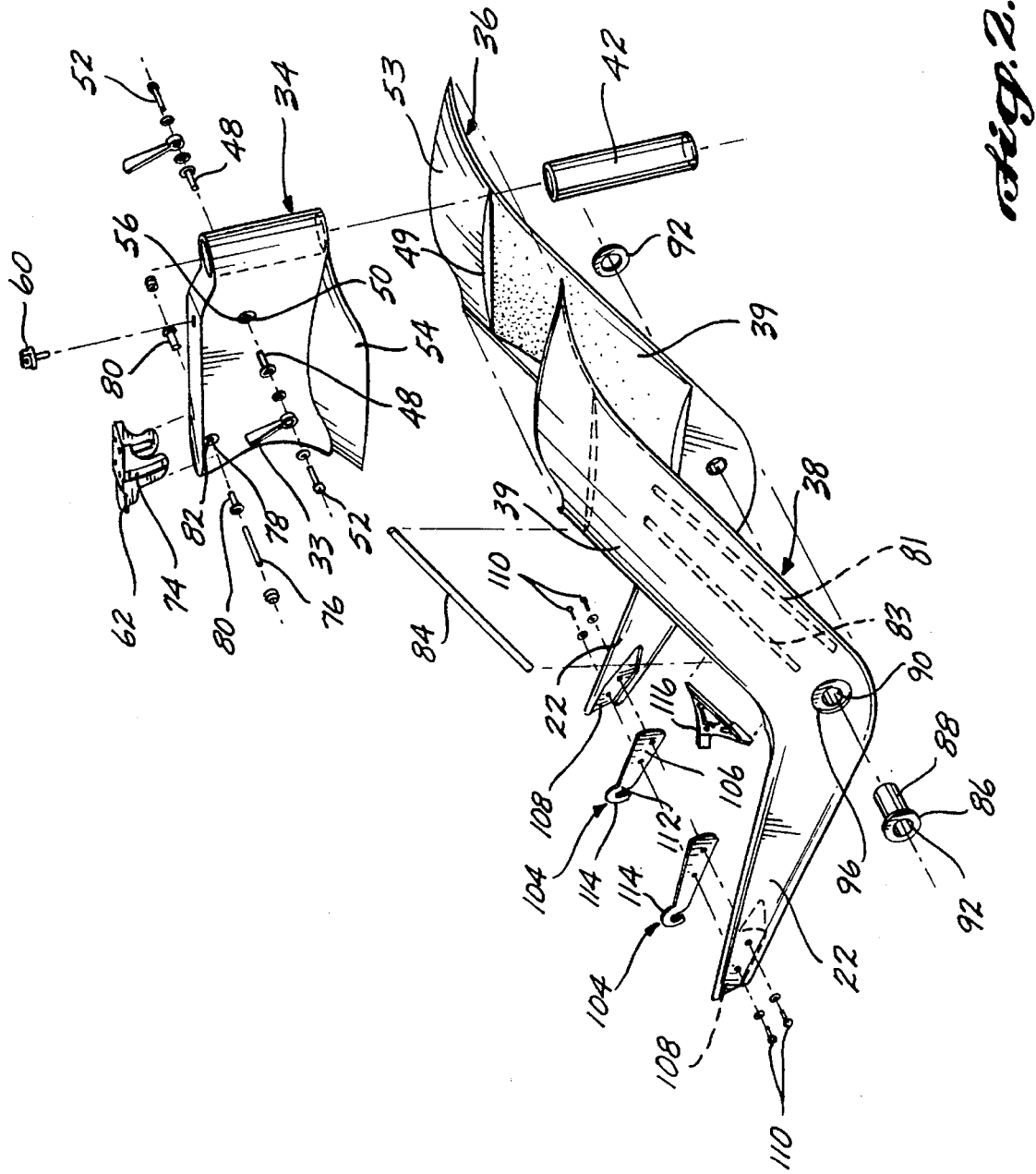
FIG. 2 is an exploded perspective of the frame of this invention.
Figure 3:
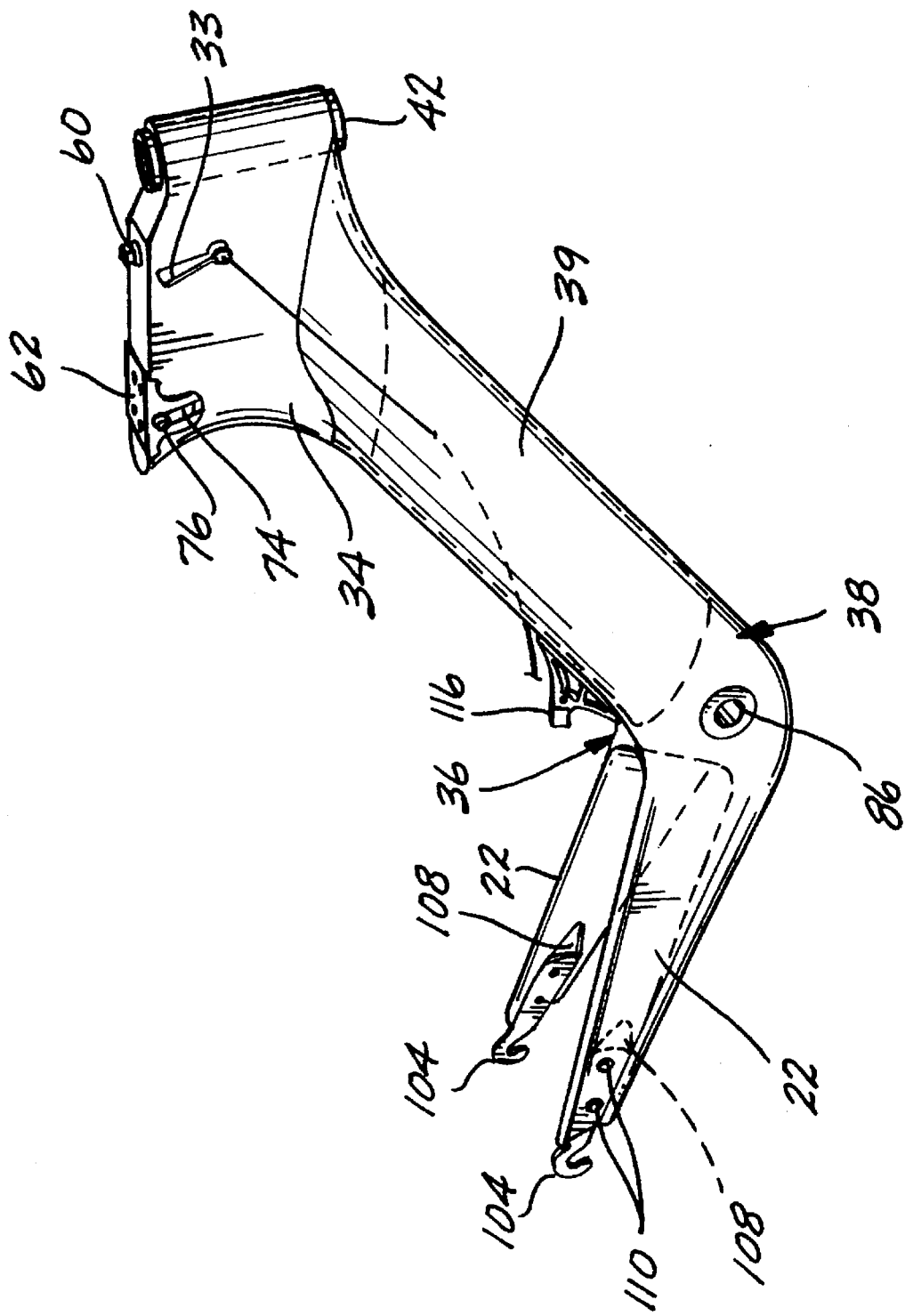
FIG. 3 is a perspective view corresponding to FIG. 2 but with parts assembled.

As depicted by FIGS. 2 and 3, the frame of the bicycle is actually formed of three distinct units, a head unit 34, a left body unit 36, and a right body unit 38. Each frame unit 34–38 is formed of urethane foam core and a skin of fiberglass, carbon fiber, an aromatic polyamide fiber, such as KEVLAR, or other rigid, nonmetallic material that is resistant to corrosion. The body units 36 and 38 are each formed with a generally diagonally extending center section 39. Each body unit 36 and 38 is further formed with a bottom leg that extends horizontally from the associated center section and diverges rearward and outward from the bottom leg of the other body unit. The legs function as the chain stays 22 of the bicycle that support the rear wheel. The head unit 34 is disposed on top of the body units 36 and 38 and has a generally rectangular shape. As will be discussed hereinafter, the frame is assembled by initially mating body units 36 and 38 together and then seating the head unit 34 in the top of the body units.

The head unit 34 is provided with a head tube 42 in which the upper end, the quill, of the front fork assembly is journaled. The head tube 42 is dimensioned to extend out of the top and bottom of the head unit 34. In some preferred versions of the invention the head tube 42 is molded in place when the foam core of the head unit is formed. In other versions of the invention, after the foam core is formed, a bore is drilled and the head tube 42 is glued in position. In either version, when the outer skin is applied over the core, the skin is applied around the portions of the tube that extend out of the core. A handlebar assembly and, more particularly, a shock-absorbing clamp for a handlebar assembly that can be used to control the orientation of the front fork assembly and the front wheel are disclosed in PCT application No. PCT/U.S.92/00781, which was published as WIPO Document No. WO 92/13749 on Aug. 20, 1992, and is incorporated herein by reference. The handlebar assembly is also disclosed in U.S. Pat. No. 5,253,544. The shifters 33 are secured to the head unit 34 adjacent and slightly rearward of the head tube 42 by a pair of sleeves 48. The sleeves 48 are secured in a bore 50 that extends longitudinally through the skin and core of the head unit. The adjacent ends of the sleeves 48 are provided with complementary threading or other fastening means so that they can be secured together. Threaded fasteners 52, which extend through the shifter components and are coupled into the sleeves 48, secure the shifters 33 to the head unit. The outer skin of the head unit is formed with recesses 56 adjacent the bore 50 in which the flanged outer ends of the sleeves, as well as some of the shifter components, are seated.

Figure 4:
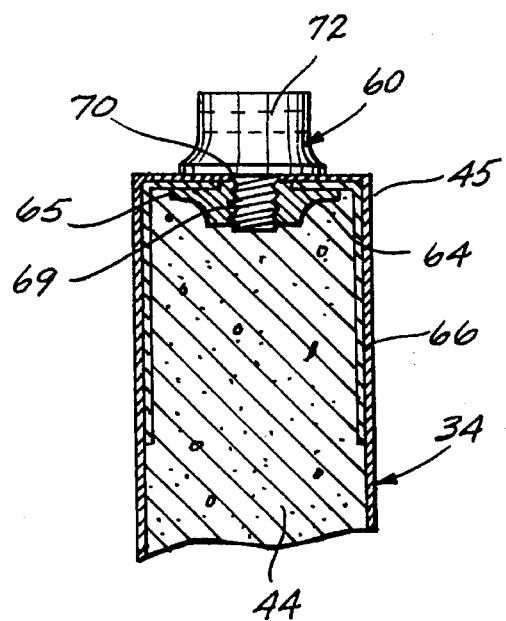
FIG. 4 is a partial sectional and cutaway view along cutting plane 4 indicated in FIG. 1, illustrating how the mounting stud is affixed to the center unit of the bicycle of this invention.

With reference to FIG. 1, the seat support 26 is in the form of an elevated beam that extends rearward from the top of the head unit 34 of the frame 12. One such seat support 26 that can be used with the bicycle 10 of this invention is disclosed in U.S. Pat. No. 4,934,724, which is owned by the assignee of this invention and incorporated herein by reference. The seat support 26 is attached to the head unit 34 by a forward mounting stud 60 and by a mounting bracket 62 located toward the rear of the head unit. As depicted by FIG. 4, the mounting stud 60 is held in position by a nut 64 and strap 66 located below the outer skin 45 of the head unit 34. The strap 66 is a three-sided structure and is formed of rigid metal approximately 25 mils thick. The opposed upright legs of the strap are seated between the core 44 and outer skin 45 of the head unit. The nut 64 is seated underneath the top web of the strap 66. The nut 64 is formed with a top square-profiled flange 65 that is dimensioned to prevent 360-degree rotation of the nut. Mounting stud 60 has a threaded body 69 adapted to be inserted through a hole 70 formed in the center of the strap 66 and screwed into nut 64. A fin 72 extends upward from the body 69 of the stud 60. The fin 72 is formed with an opening designed to accommodate a fastening pin (not illustrated) used to secure the front portion of the seat support beam to the top of the head unit.

Mounting bracket 62, best seen in FIGS. 2 and 3, is a three-sided bracket, the center section of which is secured to the seat support beam. The opposed sides of the mounting bracket 62 extend over the opposite sides of the head unit 34. Each side of the bracket 62 is formed with a curved elongated slot 74. Mounting bracket 62 is locked into position, to establish the up-down angular orientation of the seat support beam, by a fastener 76 that extends through the bracket slots 74 and the head unit 34. Specifically, the fastener 76 extends through a bore 78 formed in both the core and outer skin of the head unit 34. The fastener 76 is seated in a pair of sleeves 80 that are disposed in the bore 78. The outer skin of the head unit 34 adjacent bore 78 is formed with recesses 82 in which the flanges integral with the outer ends of the sleeves 80 and washers are seated.

Body units 36 and 38, as depicted by FIG. 2, in addition to serving as part of the structural frame of the bicycle, also define conduits for the cables that extend from the head unit to the derailleurs and the rear brake. Each body unit is formed with a first elongated bore 81, one shown, that extends from below the top of the body unit to the bottom of the body unit adjacent where the chain stay 22 is joined to the center section. Bores 81 function as the conduits through which the cables connecting the shifters to the derailleurs are housed. Right body unit 38 is further provided with a bore 83 that extends from below the top of the body unit to a point above the front derailleur and rear brake assembly. Bore 83 functions as the conduit in which the cable to the rear brake is housed. In some versions of the invention one, two, or all of the bores 81 and 83 may extend from the head unit 34 and into the body units 36 and 38. A sleeve 84 formed of rigid material may be seated in each of the bores 81 and 83 and serves as the actual conduit in which the cables therein are seated (one sleeve shown).

The bicycle crank assembly is coupled to a bottom bracket assembly 86 that is mounted in the bottom of the center section 39 of body units 36 and 38. Bottom bracket assembly 86 includes a sleeve 88 that is seated in bore 90 that extends through the cores and outer skins of the body units 36 and 38. Sleeve 88 is held in position by a pair of lock rings 92 that are fitted around the exposed ends of the sleeve. The outer skins of the body units 36 and 38 are shaped to define recesses 96 around the ends of the bore 90 in which the lock rings 92 are seated. The individual cranks of the crank assembly are connected through the bottom bracket assembly 86 by a conventional spindle and bearing assembly (not illustrated).

The rear wheel and rear derailleur are mounted to the bicycle frame by a pair of dropouts 104 that are attached to the ends of the chain stays 22. Each dropout 104 includes a base unit 106 that is seated in a recess 108 formed in the outer skin of the inside face of the associated chain stay 22. Dropouts 104 are dimensioned to closely fit in the recesses 108 so that the horizontal surfaces of the chain stay that define the recesses provide the support needed to vertically lock the dropouts in place. Threaded fasteners 110 that extend through the base units 106 of the dropouts 104 and the chain stays 22 hold the dropouts in the recesses 108. A stem section 112 extends rearward from each dropout base unit 106. Each dropout is further formed with a hook 114 at the end of the stem section 112 to which the axle assembly of the rear wheel is attached. The right-side dropout may be formed with other openings, or even a cable guide, features not illustrated, to facilitate mounting the rear derailleur and the positioning of the associated shifter cable.

Figure 14:
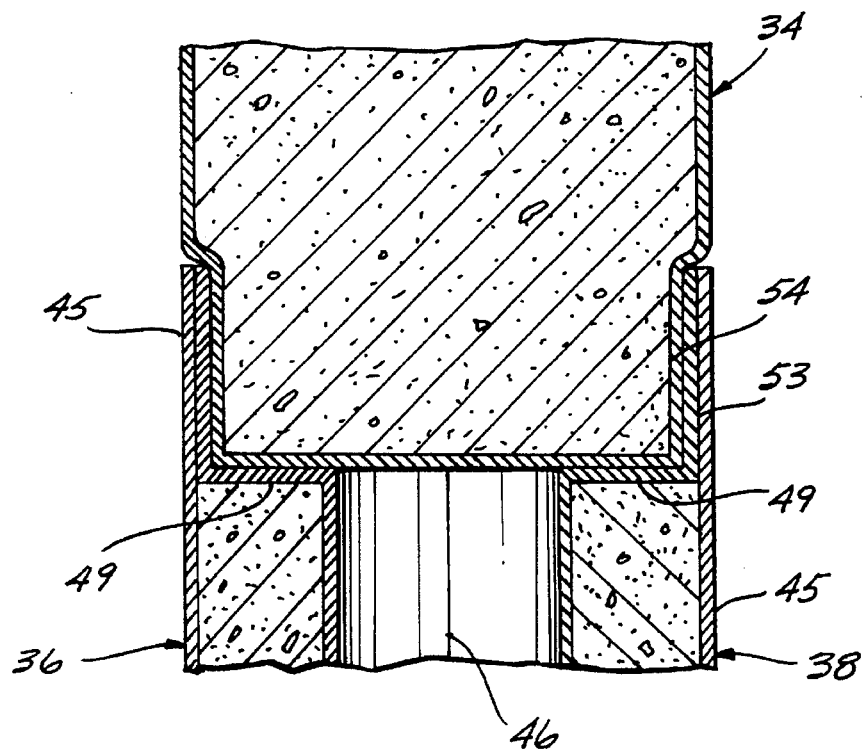
FIG. 14 is a vertical section along cutting plane 14 indicated in FIG. 1, illustrating the joint between the head and body units of the frame of this invention.

In the modification illustrated in FIGS. 5 and 6, each modified chain stay 22' is formed with a generally horizontally extending elongated through-slot 160 starting at a location closely adjacent the crank bore 90 and extending all the way to the trailing edge 162 of the chain stay. Such slot bifurcates the stay 22' into top and bottom sections of approximately equal height. Preferably, the slot is filled with elastomeric material such as a resilient urethane. As best seen in FIG. 14, each dropout 104' is also modified such that its body or base portion extends from a location substantially below the slot 160 to a location substantially above the slot. On the exterior side of each stay 22', a guide plate 164 extends from a location below the slot 160 to a location a substantial distance above the slot. The guide plate 164 and associated dropout 104' are secured to the bottom bifurcation of the stay 22', such as by a pair of pin fasteners 166. The top bifurcation of the stay is not connected to the dropout 104' or the guide plate 160. Consequently, the top bifurcation of the chain stay is supported laterally such that it remains in register with the bottom bifurcation of the stay, but the top bifurcation is resiliently supported for shock-absorbing movement toward and away from the bottom bifurcation of the stay. This provides some additional flexibility in the area of the bicycle crank for a smoother ride as the weight of the cyclist is applied to the pedals abruptly, particularly when the bicycle is ridden over uneven terrain.

The front derailleur and rear brake assembly 30, as represented by FIGS. 7–10, has a metal mount 116 that is secured between body units 36 and 38. Mount 116 is formed of a single piece and has a flat base section 118 that rests on and bridges the interface between the body units 36 and 38. A locking fin 120 extending downward from the base section stabilizes and holds the mount in position. The locking fin 120 is slightly offset from the longitudinal center axis of the base section 118 and is seated in a recess 122 formed in the right body unit 38. A top fin 124 extends upward from the base section 118. An arm 126 that is centered on the centerline of the bicycle 10 extends rearward from the top fin 124 and has a cross-sectional width slightly greater than that of the fin. A side-pull-type brake 128 is mounted to the arm 126 to function as the rear brake of the bicycle. Brake 128 is secured to the arm 126 by a fastener 130 that extends through the arm 126 and the individual arms of the brake 128. Owing to the positioning of the mount 116 and the arm 126, brake 128 lies in a horizontal plane.

A front derailleur 134 is attached to the mount 116 by an adjustably positionable bracket 136. Bracket 136 has a first faceplate 138 that is disposed against the top fin 124 of the mount 116. Plate 138 is secured to the mount 116 by first and second fasteners 140 and 142, respectively. First fastener 140 extends through a circular bore 144 formed in the top of the top fin 124 and second fastener 142 extends through a slotted, arcuate opening 146 formed below bore 144. Bracket 136 includes a second faceplate 146 that extends perpendicularly away from the first faceplate 138 and that is located slightly above the first faceplate. The front derailleur 134 is mounted to the second faceplate 146 of the bracket 136. The front derailleur 134 includes a base unit 148 that is actually attached to the second faceplate 146 and a chain guide/shifter arm assembly 145 that is pivotally mounted to the base unit. A projection 143 of the derailleur base unit 148 connects to the upright faceplate 146 by a fastener (not shown) that extends through an elongated slot 149 formed in faceplate 146.

With reference to FIG. 2, after the head unit 34 and body units 36 and 38 are fabricated, assembly of the bicycle proceeds with the mating of the body units. The fight and left body units 36 and 38 are mirror images of each other. As best seen in FIGS. 11 and 12, preferably both body units are of generally "C" shape in cross section with a foam core 44 encapsulated in a thinner outer skin 45. The facing surfaces 46 are planar at the leading and trailing edge portions of the body units for substantial contiguous engagement along the central vertical plane of the bicycle frame, leaving a substantial center void or cavity 47. Epoxy or other suitable adhesive is used to join the edge portions 46 to secure the body units together. Such joining edge portions form ribs along the leading and trailing edges of the inclined central portion of the frame.

The size of the central cavity 47 can vary along the length of the body portion of the frame. For example, as seen in FIG. 12 the walls of each body section 36 and 38 can taper in thickness from the upper portion of the body section toward the center of the body section such that the walls are substantially thinner at the center and the cavity 47 constitutes a greater portion of the enclosed area. From the central portion of the body section downward, the walls preferably increase in thickness to the area where the crank is mounted. As seen in FIG. 13, at such area the body units are of back-to-back "D" cross section with the facing surfaces 46 coplanar and contiguously engaged from their leading edges all the way to their trailing edges. While the frame's having a hollowed out central and upper portion is preferred, the entire frame can have body units of "D" cross section meeting at the central vertical plane of the bicycle, as indicated in broken lines in FIGS. 11 and 12, for greater strength, but at the expense of greater weight.

With reference to FIG. 14, the top of each body unit 36 and 38 is formed with an upward facing shoulder 49. The top margin of each body unit has a peripheral flange 53 formed by a double thickness of the skin 45 and defining an upward opening socket. The head unit 34 of the frame is formed with a downward projecting tongue 54 for close fitting in the socket formed by the peripheral flanges 45 and of a length sufficient to engage against the upward facing shoulders 49. Epoxy or other suitable adhesive applied to the adjacent skins of the head unit 34 and the body units 36 and 38 secures the units together to form the composite bicycle frame.

Once the composite frame is assembled, the various bores are drilled through the frame so that the requisite sleeves may be positioned therein. Once the sleeves are attached to the frame 12, the remainder of the components are coupled to the frame to complete the assembly of the bicycle 10.

Figure 15:
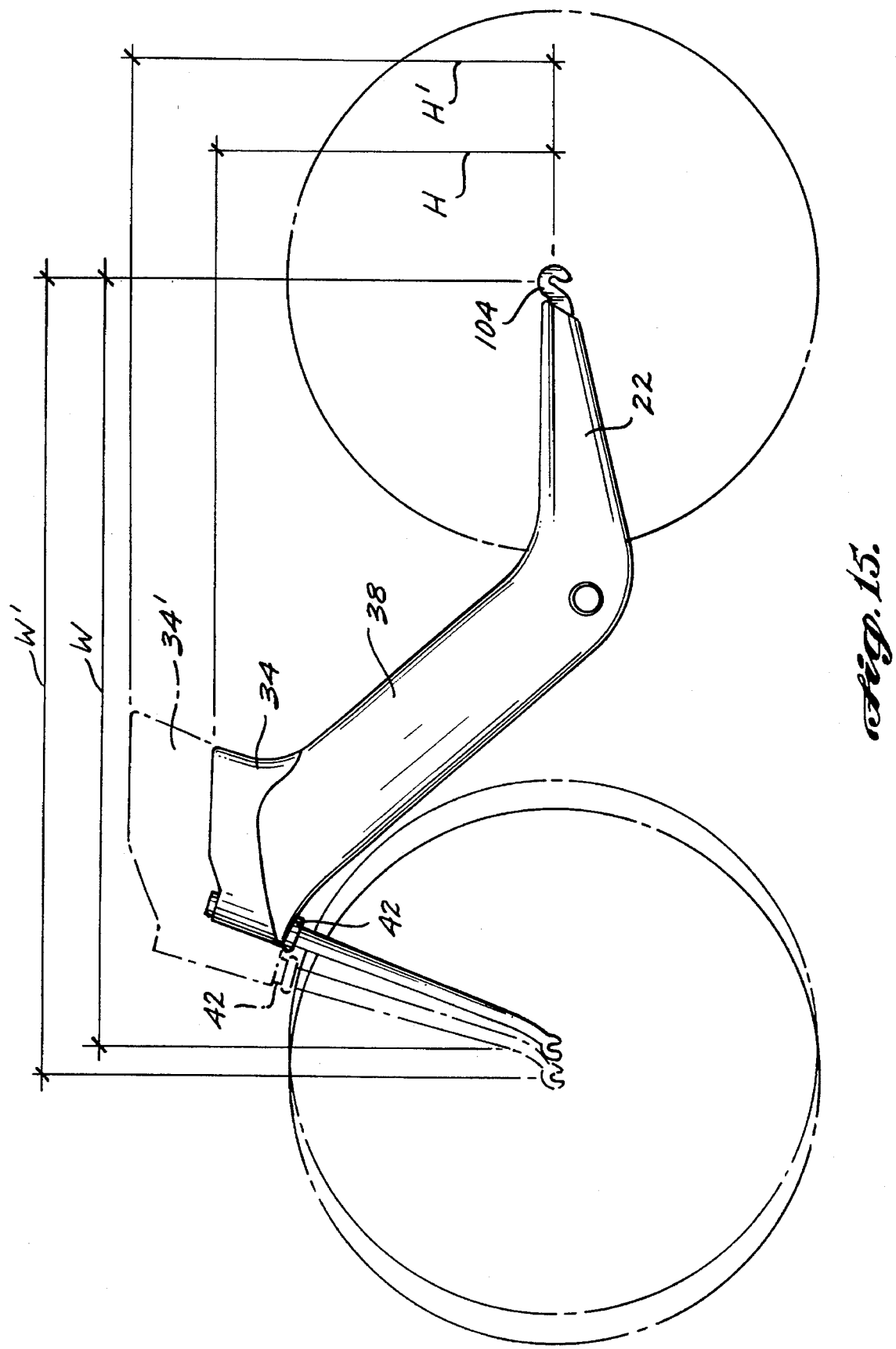
FIG. 15 is a somewhat diagrammatic side elevation of components of a bicycle having a frame in accordance with the present invention illustrating the change in geometry by use of different standardized modules.

The size and geometry of the bicycle frame can be changed by using body units or head units of different size but with identical interfitting components (i.e., tongues and sockets). FIG. 15 illustrates a representative change in geometry by using identical body units (the left unit 36 is visible) with different head units 34 and 34'. The tongues of the head units 34 and 34' are identical so that they will mate securely with the standardized body units. In a representative embodiment the height H, H' from the center of the rear wheel to the top of the head unit can vary between about 41 centimeters and about 52 centimeters by selecting an appropriately sized head unit module. Also, the modules can have different angles for the head tubes 42 resulting in a change in the wheelbase W, W' such as from about 95 centimeters to about 99 centimeters. Also, dropouts 104 of different sizes can be secured to the chain stays 22 to accommodate wheels of different sizes. All of these variations in geometry are possible by substituting different sets of modular components in order to dimension the bicycle frame according to the stature of the cyclist.

With reference to FIG. 7, the design of the front derailleur and rear brake assembly 30 further enhances the ability to attach components of different sizes to the bicycle frame. Bracket 136 can be secured to mount 116 so that the front derailleur 134 has a selected angular orientation relative to vertical. The front derailleur 134 can be selectively secured to bracket 136 so that the derailleur is a selected vertical distance from the crank assembly. This adjustability makes it possible to install a single front derailleur and rear brake assembly 30 on the frame 12 that can be used to set the positions of the chains associated with differently sized drivetrains. Thus, owing to the adjustability of the front derailleur and rear brake assembly 30 and the ability to install differently sized dropouts 104 to the chain stays 22, it is possible to construct frames 12 of this invention that can be configured to be used with differently sized bicycle wheels. For example, it is contemplated that a single bicycle frame 12 can be constructed to be used with wheels that are 26 inches, 27 inches, or 670 mm in diameter.

Still another advantage of the bicycle 10 of this invention is that the center rib, or ribs, formed when the body units 36 and 38 mate, significantly increases the structural rigidity of a bicycle without significantly increasing its overall weight. Thus, the bicycle frame 12 of this invention has an overall weight of less than four pounds and yet is structurally as strong as tubular frames weighing significantly more. Furthermore, since this bicycle does not have the top tubes and seat posts that are associated with conventional bicycles, it offers less wind resistance than bicycles of earlier designs. The relatively long profiles of the center portions 39 of the body units 36 and 38 provide surfaces upon which advertising can readily be placed without depreciating the overall aerodynamic efficiency of the bicycle.

Figure 16:
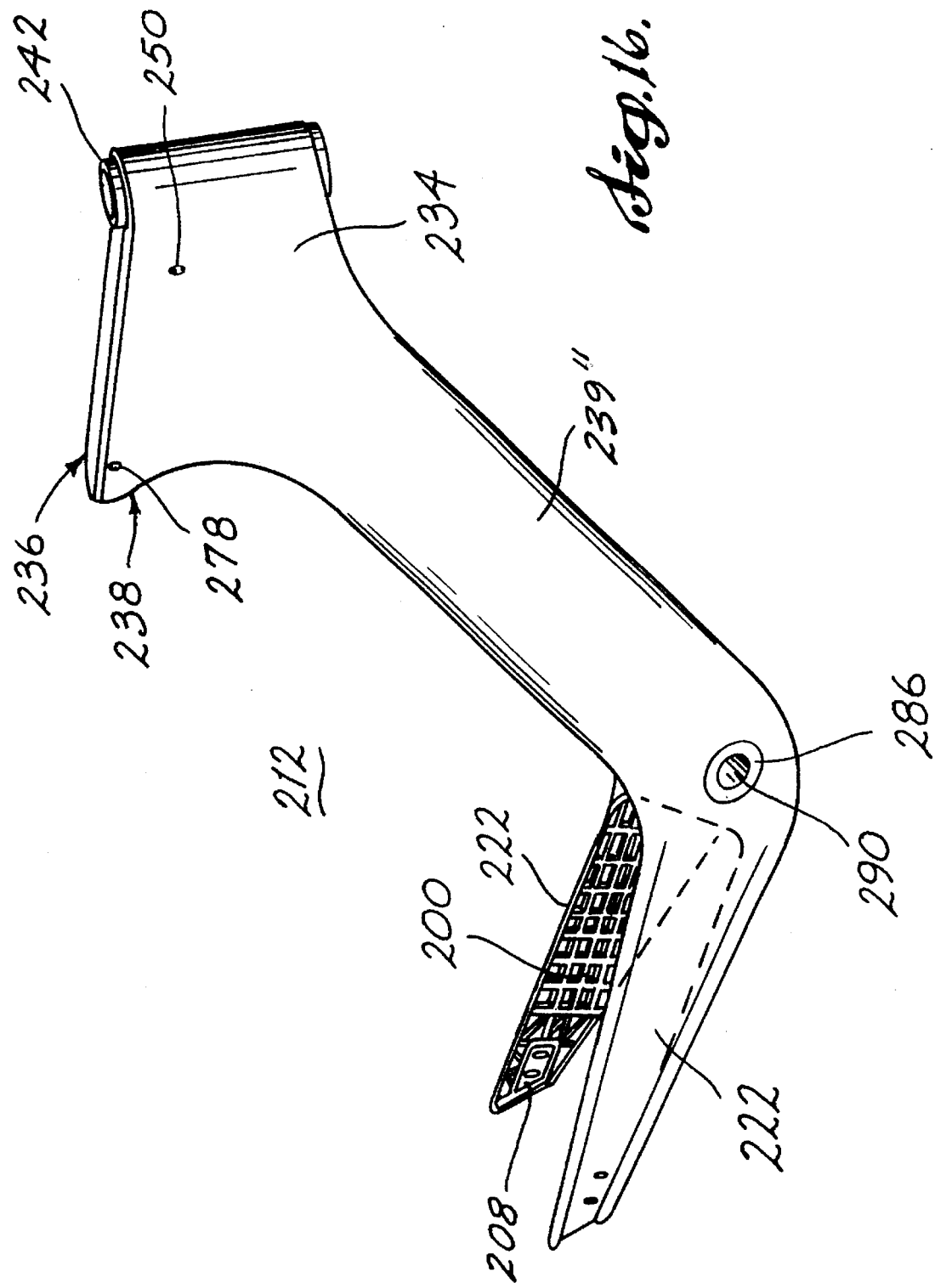
FIG. 16 is a perspective view of an injection-molded embodiment of the present invention, having two body units.
Figure 17:
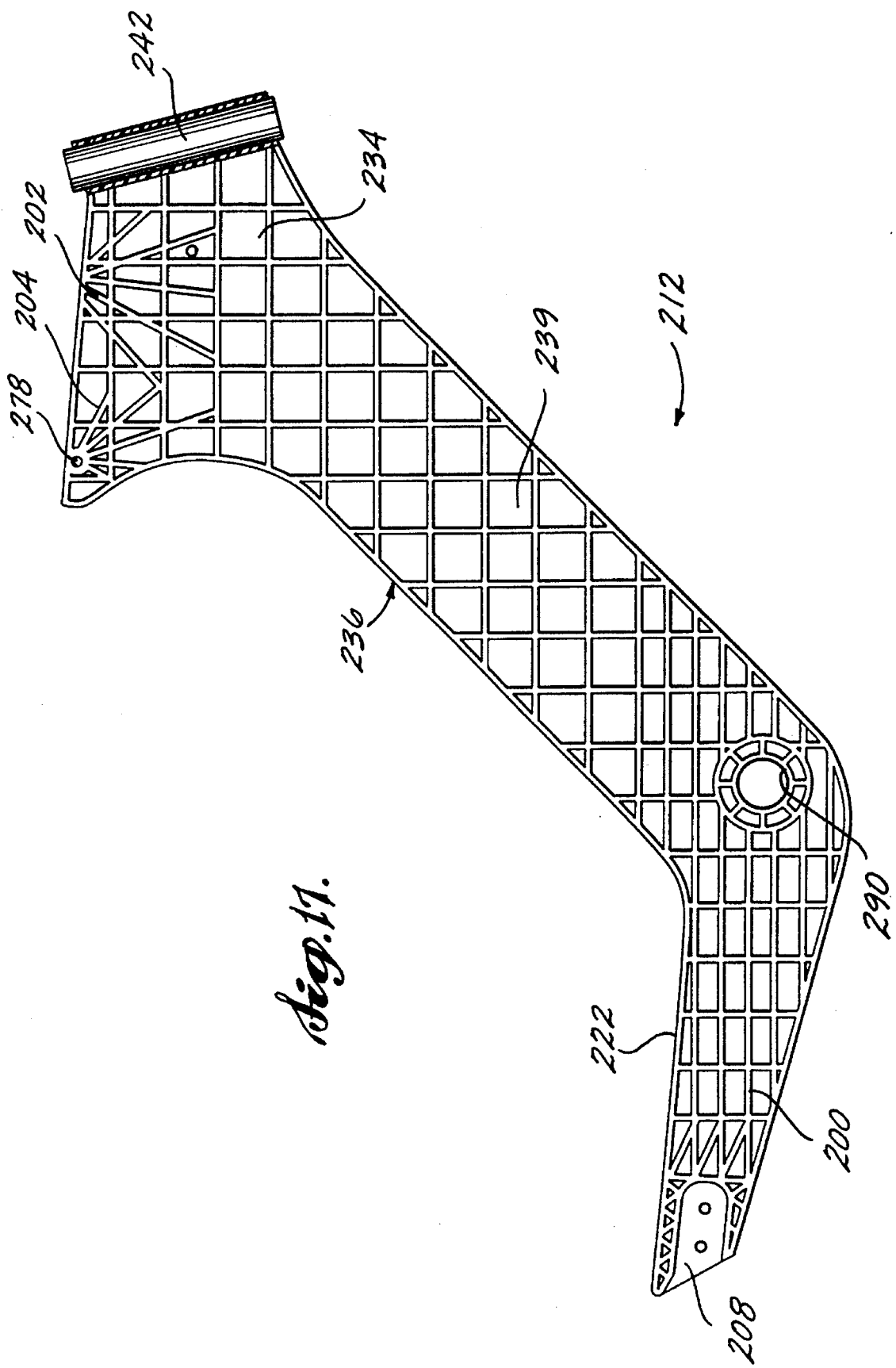
FIG. 17 is a side view of one of the body units of the embodiment illustrated in FIG. 16, illustrating a preferred rib structure.
Figure 18:
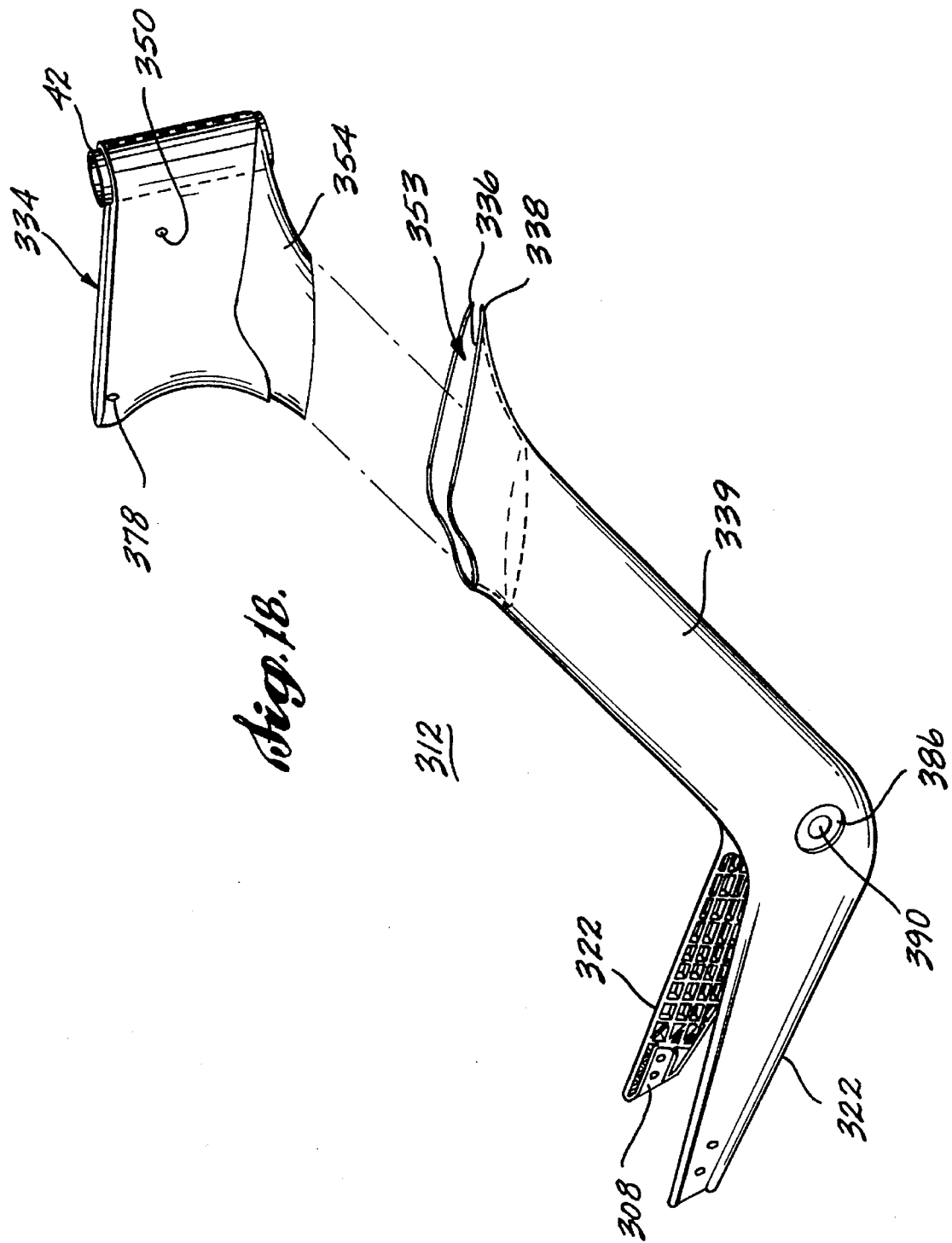
FIG. 18 is a perspective view of an alternative embodiment of the injection-molded frame of the present invention, having a separate head section.

Referring to FIGS. 16 through 18, the details of alternate, preferred embodiments of frame 12 will now be discussed. The embodiments discussed below are similar in many ways to the embodiments discussed above. Therefore, the alternate aspects of these embodiments will be the main focus of the discussion below.

FIG. 16 illustrates a frame 212 including a left body unit 236 and a right body unit 238. The left and fight body units 236 and 238 each include a head section 234, a center section 239, and a chain stay 222. Thus the frame 212 is constructed of two main body units instead of three. The head section 234 is generally parallelepiped in shape and includes a head tube 242 in which the quill of the front fork assembly is to be journaled. Preferably, each of the body units 236 and 238 has a semicylindrical portion such that the two body units 236 and 238 may be joined together around the head tube 242 to hold it in place. A seat support including, for example, the seat support 26 is attachable to the top of the head section 234 as discussed above and illustrated in FIG. 1.

The center section 239 is likewise formed from both the left and right body units 236 and 238, respectively. The two halves of the center section 239 are each integrally formed with a half of the head section 234 and one of the chain stays 222. Thus, the construction and especially the assembly of frame 212 are simplified. Because of this simplification, stress concentrations are further reduced and weight may be reduced. A weight reduction of frame 212 results from not having to extensively reinforce any joints between the head section 234 and center section 239.

The frame 212 illustrated in FIG. 16 may be constructed in a manner similar to that described above with a urethane foam core and a skin of fiberglass, carbon fiber, an aromatic polyamide fiber, such as KEVLAR, or other rigid, nonmetallic material, the method of construction varying in that the head section 234 is an integral part of the body units 236 and 238. However, another preferred, alternate form of construction is by injection molding the two body units and joining them together to form frame 212. The body units are preferably molded with a fiber-reinforced thermoplastic resin. This material is injection molded to form the two body units 236 and 238. Support ribs 200 are formed within the outer skin of the injection-molded body units 36 and 38 to provide the needed structural support to frame 212. Using a fiber-reinforced resin and properly configuring ribs 200 provides the frame 212 with the necessary structural strength to support loads not only for road riding, but also for trail riding. Added structural support can be alternatively provided by adding support plates (not shown) along the inside of the chain stays 222. Such plates may also extend between fight and left body units 36 and 37 projecting around bore 290. Such support plates would also serve to cover the support ribs 200 that are within the chain stays 222. These support plates could be constructed of metal, composite, or other materials.

The two body units are then joined together with an adhesive along the vertical plane of intersection between the two units. Alternatively, the body units 236 and 238 could be secured together with bolts, screws, or other fasteners and/or fastening methods. For example, posts or tabs could project from one body unit while the other body unit had sockets or recesses to receive the posts or tabs, thus providing not only added structural strength but aiding alignment of the body units when joining them together.

FIG. 17 illustrates a preferred arrangement of the support ribs 200 in the left body unit 236. The fight body unit 238 is essentially a mirror image of the left body unit 236 illustrated in FIG. 17. Thus, the support fibs 200 in the left body unit 236 abut the support ribs in the fight body unit 238. Support ribs 200 make up a web of intersecting fibs that form polygons, generally rectangles and triangles. Circular ribs are also formed around bore 290. The arrangement shown in FIG. 17 is meant to be illustrative only. Other rib arrangements may be employed to optimize strength and minimize weight and material. Such arrangements fall within the general scope of this invention.

Forward mounting ribs 202 extend radially outward from the point of connection of the forward end of seat support 26. The forward mounting ribs 202 provide added structural support to counter stress concentrations at the forward mounting location on the head section 234. Likewise, rearward mounting ribs 204 extend radially outward from bore 278 to provide added strength at the rearward attachment point of seat support 26. Ribs 200 are generally closer together near the bottom of center section 239 and all throughout chain stays 222 to provide additional strength in this region of the frame 212, due to the leveraged forces existent in these areas during riding. A close fib arrangement is utilized in the region surrounding recess 208 for adequate transmittal of forces from the rear wheel through dropouts 104 (shown in FIG. 2) to frame 212.

Referring to FIG. 18, an alternate construction of the frame 3 12 will now be discussed. Frame 3 12 is preferably injection molded in a manner and form similar to that discussed above except for the inclusion of a separate head section 334. In this embodiment, the body units 336 and 338 are joined to create the center section 339 and the chain stays 322 but not the head section 334. The left and right body units 336 and 338, respectively, form the peripheral flange 353 at the top of the center section 339 to receive the tongue 354 of head section 334. The head section 334 may also be injection molded in one or multiple pieces or formed in another fashion before being inserted within peripheral flange 353.

Figure 19:
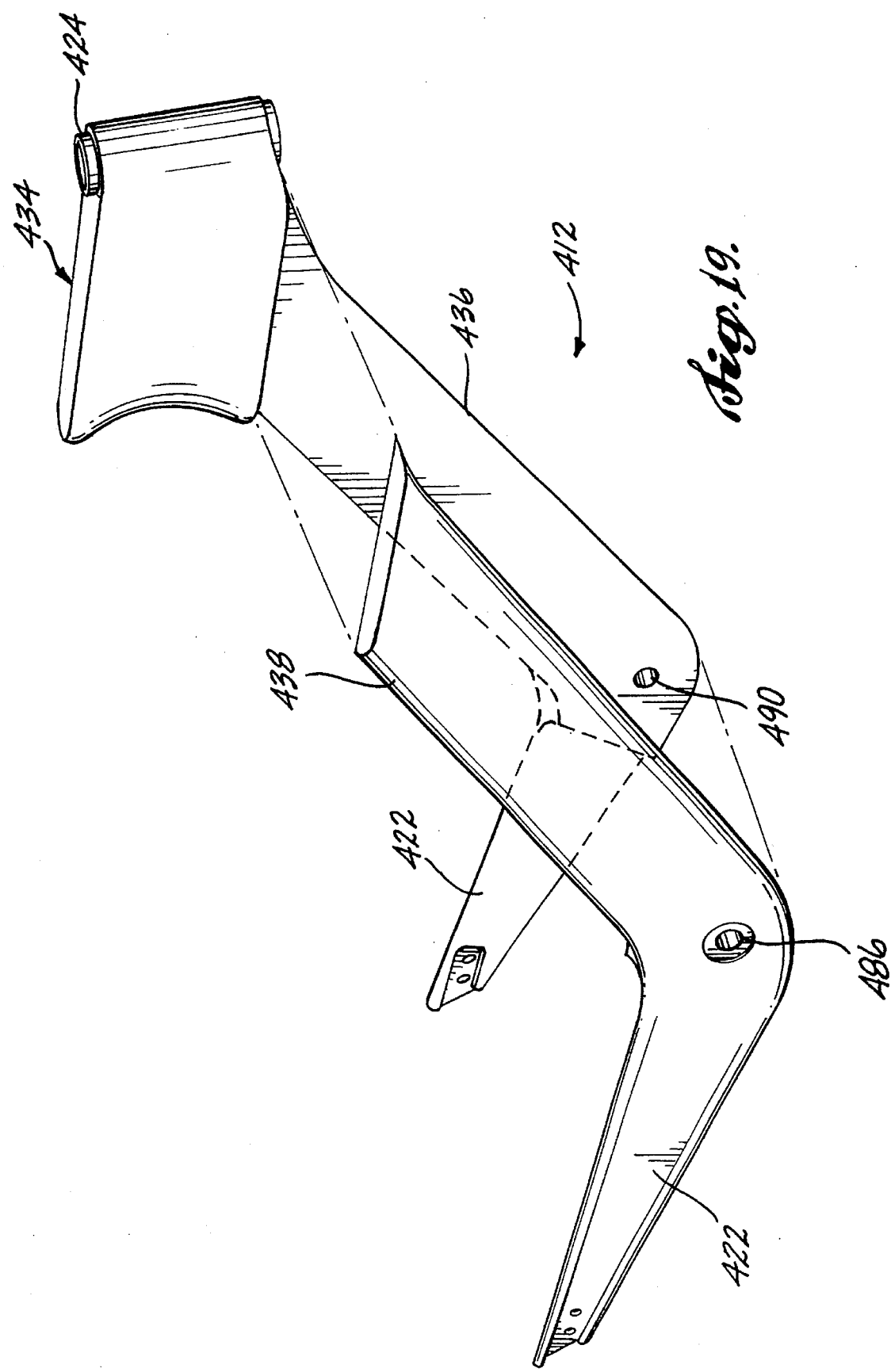
FIG. 19 is a perspective view of an alternate embodiment of the invention, having an integral head section and modular body unit.

Referring to FIG. 19, another alternate embodiment of frame 412 is provided. In this embodiment fight and left body units 438 and 436, respectively, are provided. Left body unit 436 includes an integrally formed head section 434 that is arranged and configured for mounting seat support 26 (not illustrated in FIG. 19) and head tube 442. Left body unit 436 also includes a chain stay 422 extending rearward of bore 490. Right body unit 438 also has a chain stay 422 integrally formed therewith. However, right body unit 438 does not include a head section. Right body unit 438 is joined to left body unit 436 such that the upper end of right body unit 438 is attached beneath head section 434. Thus, frame 412 is modular with only two pieces or units. Frame 412 may be constructed of standard composite materials or other materials as described herein.

Figure 20:
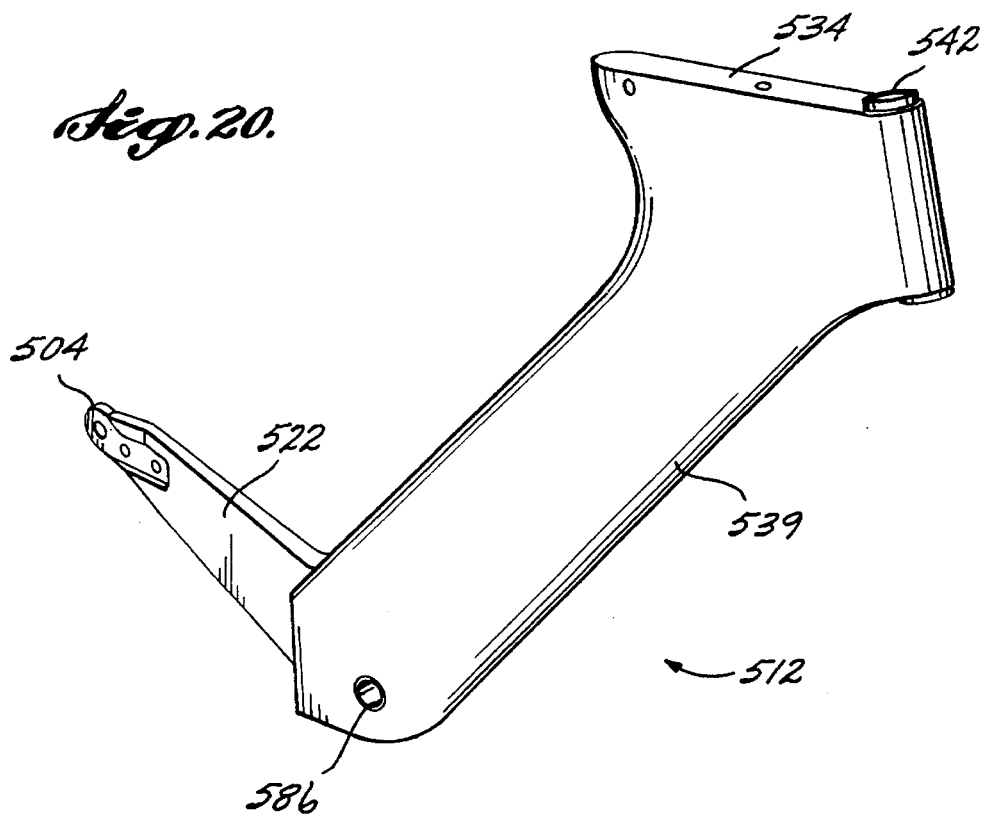
FIG. 20 is a perspective view of an alternate embodiment of the invention, having a monostay configuration.

FIG. 20 illustrates an alternate embodiment of the present invention having a monostay 522. Since frame 5 12 is provided with only one chain stay, i.e., monostay 522, it is of heavy-duty construction to be able to withstand the torsional and bending forces transmitted through it. A special wheel support 504 is provided instead of standard dropouts. Wheel support 504 is a solid support bracket with a horizontal bore provided for attachment of the bicycle wheel. The remainder of frame 512 may be constructed according to any method described herein.

Figure 21:
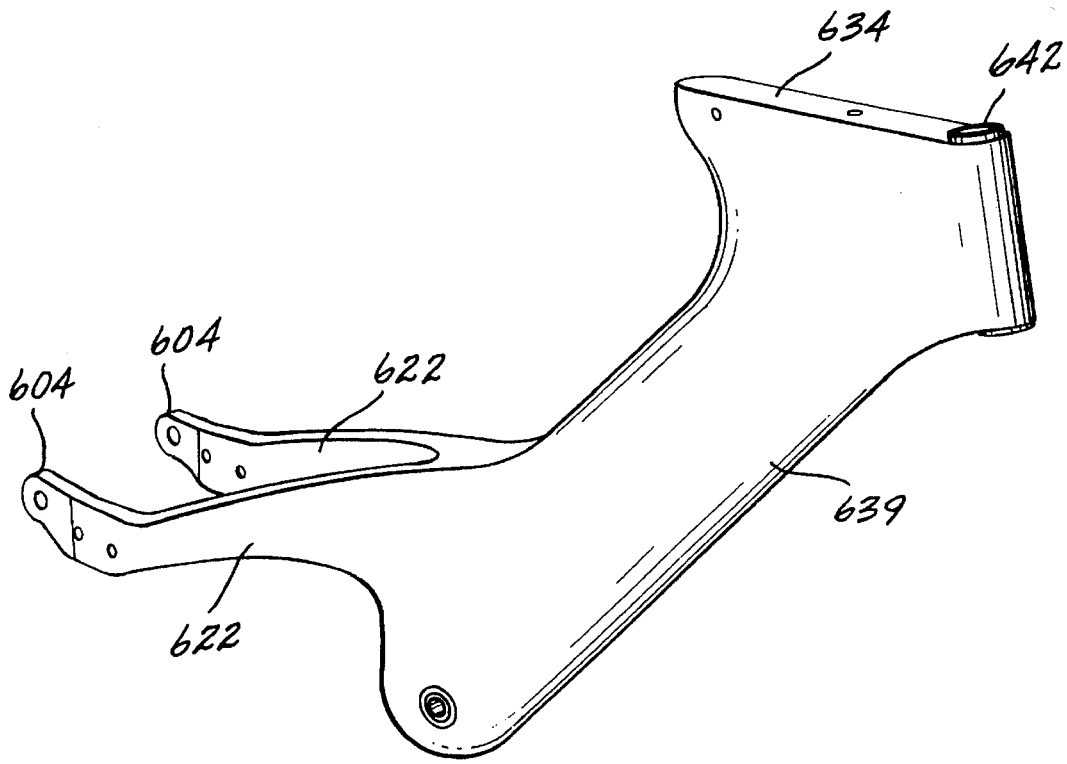
FIG. 21 is a perspective view of an alternate embodiment of the invention, having arched chain stays.

Still another alternate embodiment of the invention utilizing different chain stays is illustrated in FIG. 21. In this embodiment, arched stays 622 are provided that extend from above bottom bracket assembly 686. Arched stays 622 arch so as to pass above the upper run of chain 25 (not illustrated in FIG. 21) down to wheel supports 604 where the wheel 16 is mounted in its standard position. Frame 612 may be constructed according to any of the methods described herein. One of the advantages of providing arched chain stays 622 is that their attachment above bottom bracket assembly 686 allows them to have a thicker section without interfering with chain 25. Thus, the high forces transmitted through arched stays 622, which do not have frame stays to aid in their support, can more easily support the loads involved.

Arched chain stays 622 actually provide the rear-wheel support advantages of a tubular bicycle with frame stays in that they extend upwardly from wheel supports 604 to counter upward forces. Arched stays 622 also provide the advantages of chain stays, since they are connected to center section 639 near bottom bracket assembly 686. Thus, they counteract torsional forces at bottom bracket assembly 686.

Figure 22:
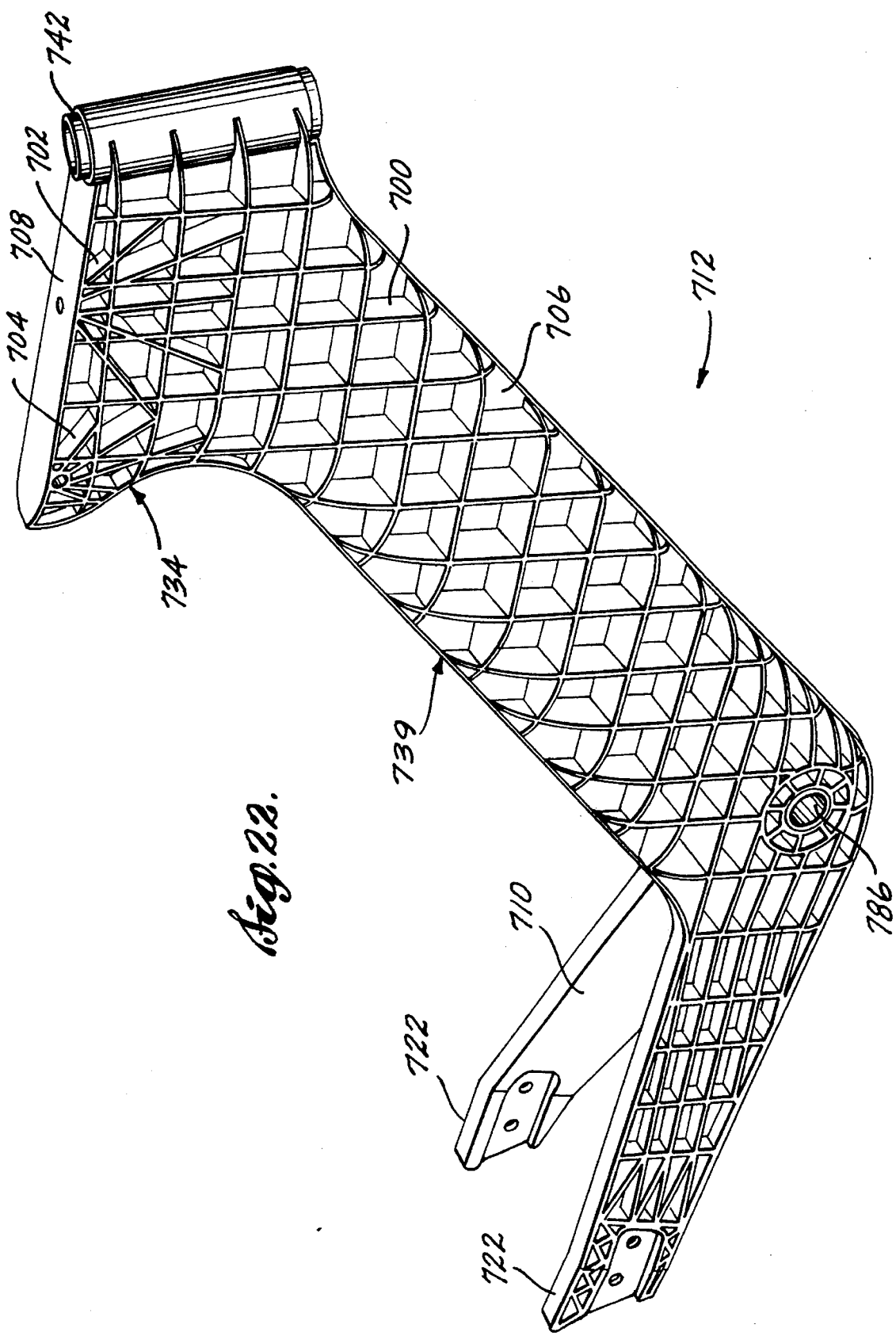
FIG. 22 is a perspective view of an alternate embodiment of the invention having an external rib structure.

Referring now to FIG. 22, an embodiment of the present invention with externally projecting ribs will now be described. This embodiment of the invention is similar in many ways to the embodiment illustrated in FIGS. 16 and 17, described above. However, instead of having an external shell within which support ribs 200 are disposed, frame 712 includes a vertical body beam 706 from which external ribs 700 project outwardly. With this construction, frame 712 can be injection molded as a single unit. Thus, the joining of modular units is not necessary and production costs may be greatly reduced. Components that are preferably constructed of metal, such as head tube 742 and bottom bracket assembly 786, may be insert-molded into frame 712.

The rib structure configuration illustrated in FIG. 22 is similar to that illustrated in FIG. 17. However, alternate rib structures can also be used. A flat top rib 708 is provided on top of head section 734 for mounting of a seat support thereon. Body beam 706 is generally flat and is centrally located in the middle of external ribs 700 along the extent of head section 734 and center section 739. Body beam 706 aids in proper dispersion of the injection-molded plastic material when frame 712 is injection molded. Body beam 706 splits behind bottom bracket assembly 786 to form inner walls 710 of chain stays 722. Note also that external ribs 700 extend partially around head tube 742 to provide adequate structural support at this location of high stress concentration. As with the embodiment described above and illustrated in FIGS. 16 and 17, preferably a fiber-reinforced thermoplastic resin is used.

To improve aerodynamics, and possibly to change the aesthetics, of the embodiment described above and illustrated in FIG. 22, a shell may be disposed around external ribs 700 of frame 712. Such a shell is preferably not needed for structural purposes since body beam 706 and external ribs 700 accomplish that task. However, a fabric, plastic, or other shell could be secured around frame 712. For example, shrink-wrap-type plastic could be positioned around frame 712 and heated to tightly conform to the frame.

It should be noted that an external rib construction can also be used with the other frame arrangements described above. For example, monostay frame 512, illustrated in FIG. 20, may be constructed with external ribs such that it may be injection molded as a single piece. A rib structure similar to that described with reference to FIG. 22 could be used. Likewise, frame 612 with arched chain stays 622 could alternatively be constructed as a single-piece injection-molded unit with external ribs.

Figure 23:
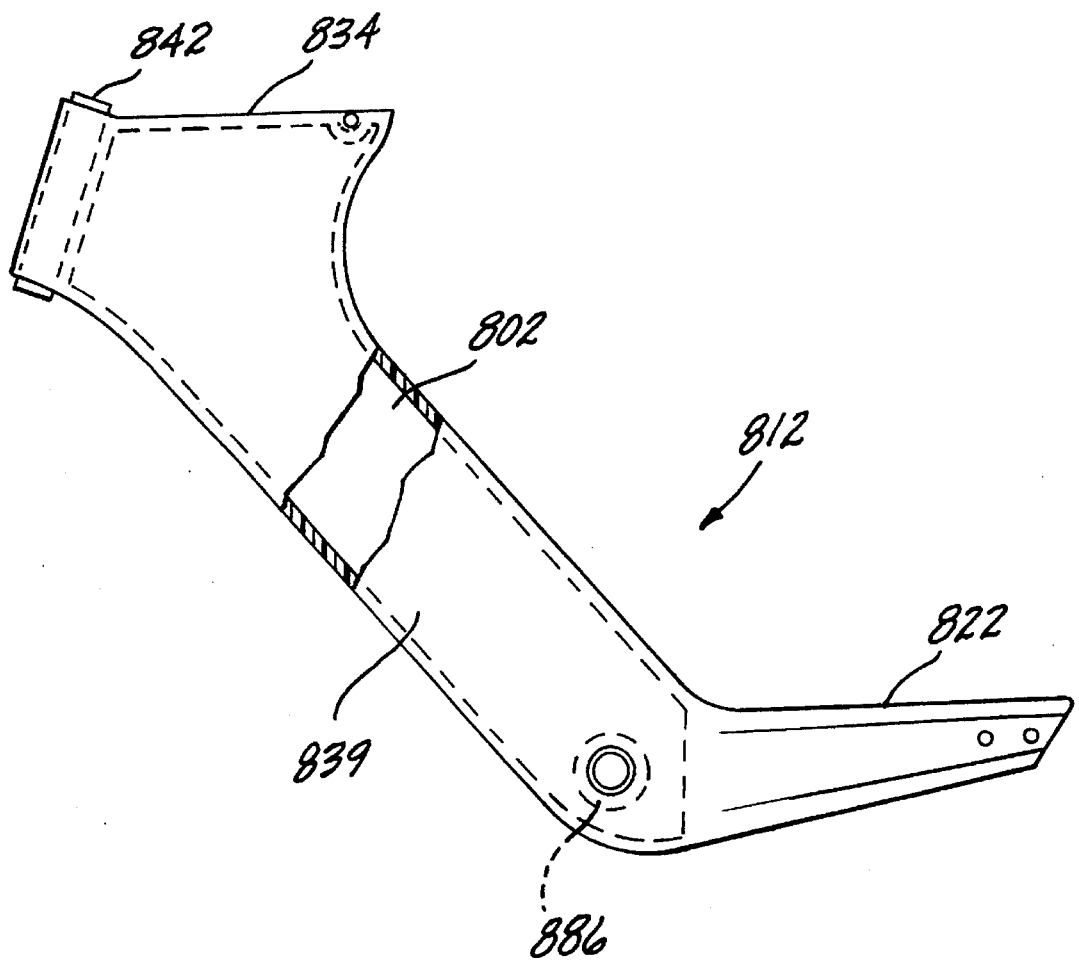
FIG. 23 is a side view of a blow-molded embodiment of the bicycle of the present invention.
Figure 24:
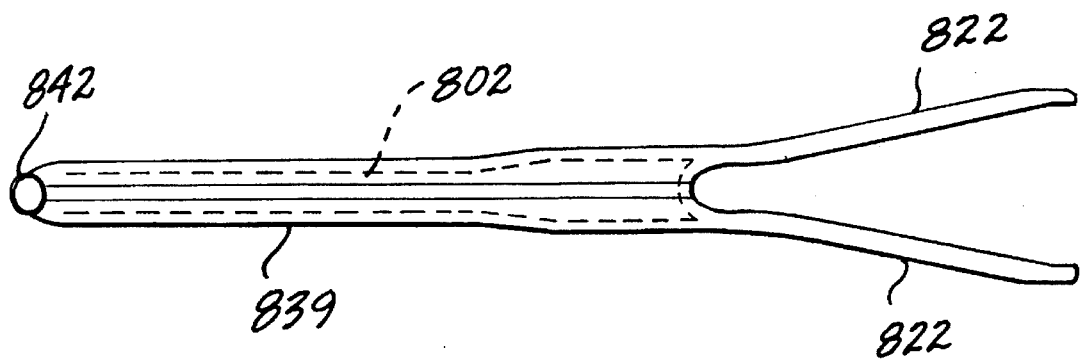
FIG. 24 is a bottom view of the embodiment illustrated in FIG. 23.

Another method of constructing several of the embodiments described above with a reinforced thermoplastic material is an injection-molding process using an internal bladder to create a hollow core. A bicycle formed by this process is illustrated in FIGS. 23 and 24. In this process, a plastic bladder 802 is heated and blown into an inner mold shape with air. A thermoplastic composite is preferably used to form inner bladder 802. A polycarbonate or other material may alternatively be used. Bladder 802 is allowed to cool and is inserted and suspended within an outer mold. The space between bladder 802 and the outer mold corresponds to the thickness of the walls of the finished bicycle frame 812. Besides bladder 802 being inserted into the outer mold, bottom bracket assembly 886, head tube 842, and other bicycle fixtures are also preferably positioned within the outer mold before frame 812 is injection molded. The next step is to injection mold the fiber-reinforced thermoplastic material between bladder 802 and the outer mold. A liquid or other material may be inserted within bladder 802 to help it withstand the pressure from the step of injecting the thermoplastic material. Bladder 802 may alternatively be constructed with a rib structure to withstand the pressures involved or lower pressures may be used. The thermoplastic is allowed to cool and the mold is removed producing a frame 812 with a partially hollow core. Center section 839 and head section 834 are preferably at least partially hollow with the thickness of the walls defined by the space between inner bladder 802 and the outer mold. Chain stays 822 are preferably formed without bladder 802 such that they are formed solid to attain high structural integrity, while being much thinner in cross section than center section 839 and head section 834.

Bladder 802 is alternatively constructed of a plastic material sealed around its outer perimeter by heat sealing, gluing, stitching, or other sealing method. A precise amount of liquid is added to bladder 802 before frame 812 is injection molded. The liquid prevents bladder 802 from collapsing under the injection pressures. The liquid-filled bladder 802 disposed within an outer mold leaves space for only a predetermined amount of resin to form frame 812. The liquid is drained after the resin is at least partially cured.

As another alternative means of construction, the bladder is not filled or otherwise supported from collapse before injection of the resin. A predetermined, precise amount of resin is injected, after which a gas or liquid is pumped into bladder 802 such that bladder 802 expands to form a hollow core with the resin filling the mold around bladder 802 to form frame 812. Once the resin at least partially cures the gas or liquid may be removed.

Still another method of constructing frame 812 as shown in FIGS. 23 and 24 involves a removable core process. Instead of using bladder 802 to form the hollow core of center section 839, the fiber-reinforced thermoplastic material is injected between a mold and a removable core placed within the mold. As with the blow-molding process, the fixtures, such as the head tube and bottom bracket assembly, may be placed into the mold and, depending on fixture positioning, into the removable core material before the plastic is injected. The removable core is formed from a melt-out salt, a metal with a low melting point, or another dissolvable or meltable core. Thus, the core is first created with the desired inside shape of center section 839, the core is placed in a mold, the plastic is injected between the mold and the core, and the core is melted or dissolved such that it can be poured or otherwise removed from the core of center section 839. The process results in bicycle frame 812 with a hollow core as illustrated in FIGS. 23 and 24.

It will be understood that the foregoing description is for the purposes of illustration only. It will be readily recognized that bicycle 10 of this invention can be constructed of alternative components and alternative materials to those that have been described by way of example above. For example, in some preferred versions of the invention, instead of having two body units, it may be desirable to have a single body unit with which both chain stays are integral and in which the head unit is seated. In still other versions of the invention it may be desirable to construct the bicycle so that the body units are seated in the head unit. Furthermore, it should be understood that other features and accessories can be added or removed from the bicycle. For example, it may be desirable to add a cage for a water bottle or a bracket for holding a pump. Alternatively, there may be versions of the invention for which it would be desirable to eliminate the bores in which the derailleur cables and brake cable are mounted and, instead, attach those components to the cable housings that are located outside of the frame 12. It should similarly be recognized that other seat supports may be used to provide structural linkage between the bicycle seat 28 and the frame 12. Therefore, it is an object of the appended claims to cover all such modifications and variations that come within the true spirit and scope of the invention.

The embodiments of the invention in which an exclusive property or privilege is claimed are defined as follows:

1. A bicycle frame assembly for securing a seat assembly, wheels, a crank assembly, a front fork assembly, and a handlebar, the bicycle frame assembly comprising:

(a) a separately-formed first body unit comprising a first outer shell with an inside surface and first internal ribs extending in a plurality of directions, said first internal ribs projecting inwardly from said inside surface of said first outer shell to form a first support structure, said first body unit including a first center section; and (b) a separately-formed second body unit comprising a second outer shell with an inside surface and second internal ribs extending in a plurality of directions, said second internal ribs projecting inwardly from said inside surface of said second outer shell to form a second support structure, said first and second body units being arranged and configured to mate together, said first outer shell being configured to mate along at least a portion of its perimeter with the perimeter of said second outer shell and at least a portion of said first internal ribs configured to mate with at least a portion of said second internal fibs; wherein the mated shells enclose said first and second internal ribs within the mated portions of said shells; wherein said second body unit includes a second center section and a chain stay extending rearwardly of said second center section.

2. The bicycle frame assembly of claim 1, wherein each of said body units is constructed of integrally formed, fiber-reinforced plastic material.

3. The bicycle frame assembly of claim 2, wherein each of said body units further includes head sections formed integral therewith, said head sections including internal ribs that are arranged and configured to abut each other throughout at least a portion of said head section, said head sections including recessed portions adapted to secure a head tube for attachment of the front fork assembly.

4. The bicycle frame assembly of claim 3, wherein said head sections further include mounting means for attachment of a seat assembly, including a seat support beam adapted to extend rearward from said head section, and wherein said center sections extend downwardly and rearwardly from said head sections.

5. The bicycle frame assembly of claim 4, wherein each of said first and second body units includes a chain stay extending from said center section near said bottom bracket bore.

6. The bicycle frame assembly of claim 5, wherein said chain stays extend from said center section above said bottom bracket bore to rearward ends, said chain stays having a broad connection zone to said center section and tapering toward the rearward ends.

7. The bicycle frame assembly of claim 2, further including a head section having means for attachment to said center section of said body units, said head section including a cylindrical portion adapted to secure a head tube and a mounting means for attachment of a seat assembly including a seat support beam adapted to extend rearward from said head section.

8. The bicycle frame assembly of claim 1, wherein said first body unit includes a chain stay, and said second body unit terminates at the bottom of said center section near said bottom bracket such that said second body unit does not include a chain stay.

9. The bicycle frame assembly of claim 1, wherein said first body unit includes an integral head section, said head section being arranged and configured to abut an upper end of the second body unit for attachment therewith, said head section being adapted to secure a head tube and a seat assembly including a seat support beam.

10. A bicycle comprising:

(a) a frame formed of composite material, said frame including at least two separately-formed body units, said body units each having a center section, a head section, and a chain stay extending rearward from said center section;

(b) a seat assembly including a seat support beam attached to said head section, said seat support beam extending rearwardly from said head section, and a seat attached to a portion of said seat support beam distal from said head section;

(c) a from wheel assembly including a front fork assembly rotatably coupled to said head section, a front wheel attached to said front fork assembly below said head section, and a handlebar assembly attached to said front fork assembly above said head section;

(d) a rear wheel rotatably coupled to said chain stays; and (e) a drivetrain assembly including a free gear secured to said rear wheel, a crank assembly secured to said center section of said body units, and a drive chain connecting said crank assembly to said free gear.

11. The bicycle of claim 10, wherein said body units are symmetrically shaped.

12. The bicycle of claim 10, wherein said frame further includes at least one support rib, and wherein said body units of said frame are each formed with a foam core and skin formed from rigid, nonmetallic material, said body units being adapted to be mated so that said skins of said body units join each other and said skins together being said at least one support rib.

13. The bicycle of claim 10, wherein said body units are each formed of injection-molded plastic with reinforcing fibers, each of said body units including a shell and support fibs, said ribs being integrally formed with and extending from the inside surfaces of said shells, said body units being mated so that said shells join each other to substantially enclose said ribs along at least a portion of said central section.

14. The bicycle of claim 10, wherein said body units include interfitting portions joined together.

15. The bicycle of claim 10, further including a head tube extending longitudinally through said head section and wherein said front fork assembly is disposed in said head tube.

16. The bicycle assembly of claim 15, further including a bottom bracket assembly including a sleeve extending longitudinally through said body units, wherein said crank assembly is rotatably mounted to said bottom bracket assembly.

17. The bicycle assembly of claim 16, further including two dropouts for securing said rear wheel to said chain stays, said dropouts being releasably secured in recesses formed in said chain stays.

18. The bicycle assembly of claim 16, further including a front derailleur and rear brake assembly attached to said body units adjacent said crank assembly, said from derailleur and rear brake including a front derailleur having a chain guide disposed around said drive chain and a brake disposed around said rear wheel.

19. The bicycle assembly of claim 18, wherein said front derailleur and rear brake assembly includes a mount secured to said body units and said front derailleur is connected to said assembly mount to pivot about said assembly mount.

20. The bicycle assembly of claim 10, further including at least one derailleur attached to said frame to change the position of said drive chain, a shifter attached to said head section, and a shifter cable extending from said shifter to said derailleur for controlling the position of said derailleur in response to movement of said shifter and wherein one of said body units is formed with a bore and said derailleur cable is partially disposed in said bore.

21. A bicycle frame comprising:
(a) a head section having means for mounting a seat support beam and means for securing a front fork assembly;
(b) a center section extending downwardly from said head section, the lower end of said center section having means for coupling a crank assembly; and
(c) at least one chain stay extending rearwardly from said center section, said chain stay including means for attaching a rear wheel; wherein said head section and said center section include a generally centrally located body beam providing the main support and the basic shape of said head section and said center section and support ribs projecting outwardly from said body beam, said support ribs extending across said body beam in a plurality of directions.

22. The bicycle frame of claim 21, wherein said chain stay includes an inner wall extending rearwardly from said body beam and chain stay support ribs projecting outwardly from said inner wall.

23. The bicycle frame of claim 21, further including a shell completely surrounding at least a portion of said support ribs.

24. The bicycle frame of claim 21, wherein said body beam, said inner walls, said support ribs, and said chain stay support ribs are integral members comprising an injection-molded plastic.

25. The bicycle frame of claim 24, further including a shell surrounding at least a portion of said support ribs.

26. The bicycle frame of claim 25, wherein said shell comprises a shrink-wrap plastic material.

27. The bicycle frame of claim 25, wherein said shell comprises a fabric material.

28. A bicycle frame assembly comprising:
(a) a first body unit comprising a first outer shell with an inside surface and first internal ribs, said first internal ribs projecting from said inside surface of said first outer shell to form a first support structure, said first body unit including a chain stay; and
(b) a second body unit comprising a second outer shell with an inside surface and second internal ribs, said second internal ribs projecting from said inside surface of said second outer shell to form a second support structure, said first and second body units being arranged and configured to mate together, said first outer shell being configured to mate along at least a portion of its perimeter with the perimeter of said second outer shell and at least a portion of said first internal ribs configured to mate with at least a portion of said second internal ribs; wherein at least one of said first and second body units includes a center section, said center section having a bottom bracket bore disposed within a lower portion of said center section, said chain stay extending rearwardly of said center section, said second body unit terminating at the bottom of said center section near said bottom bracket such that said second body unit does not include a chain stay.

29. A bicycle comprising:
(a) a frame formed of composite material, said frame including at least two body units, said body units each having a center section, a head section including a head tube extending longitudinally through said head section and a chain stay extending rearward from said center section;
(b) a seat assembly including a seat support beam attached to hid head section, said seat support beam extending rearwardly from said head section, and a seat attached to a portion of said seat support beam distal from said head section;
(c) a front wheel assembly including a front fork assembly rotatably coupled to said head tube of said head section, a front wheel attached to said front fork assembly below said head section, and a handlebar assembly attached to said front fork assembly above said head section;
(d) s rut wheel rotatably coupled to said chain stays;
(e) a drivetrain assembly including a free gear secured to said rear wheel, a bottom bracket assembly including a sleeve extending longitudinally through said center section of said body units, crank assembly rotatably mounted to said bottom bracket assembly of said body units, and a drive chain connecting said crank assembly to said free gear; and
(f) a front derailleur and rear brake assembly attached to said body units adjacent said crank assembly, said front derailleur and rear brake including a front derailleur having a chain guide disposed around said drive chain and a brake disposed around said rear wheel, wherein said from derailleur and rear brake assembly includes a mount secured to said body units and said front derailleur is connected to said assembly mount to pivot about said assembly mount.

\* \* \* \* \*

UNITED STATES PATENT AND TRADEMARK OFFICE
CERTIFICATE OF CORRECTION

PATENT NO. : 5,456,481  
DATED : October 10, 1995  
INVENTOR(S) : J.D. Allsop et al.

It is certified that error appears in the above-indentified patent and that said Letters Patent is hereby corrected as shown below:

| COLUMN | LINE | |
|---|---|---|
| 7 | 41 | "fight" should read --right-- |
| 9 | 60 | "fight" should read --right-- |
| 10 | 9 | "fight" should read --right-- |
| 10 | 11 | "fibs" should read --ribs-- |
| 10 | 12 | "fight" should read --right-- |
| 10 | 13 | "fibs" should read --ribs-- |
| 10 | 31 | "fib" should read --rib--. |
| 10 | 36 | "3 12" first occurrence should read --312-- |
| 10 | 36 | "3 12" second occurrence should read --312-- |
| 10 | 49 | "fight" should read --right-- |
| 10 | 64 | "5 12" should read --512-- |
| 11 | 44 | "fiat" should read --flat-- |
| 11 | 46 | "fiat" should read --flat-- |

UNITED STATES PATENT AND TRADEMARK OFFICE
CERTIFICATE OF CORRECTION

PATENT NO. : 5,456,481

DATED : October 10, 1995

INVENTOR(S) : J.D. Allsop et al.

It is certified that error appears in the above-indentified patent and that said Letters Patent is hereby corrected as shown below:

| COLUMN | LINE | |
|---|---|---|
| 13 (Claim 1, | 57 line 21) | "fibs;" should read --ribs;-- |
| 14 (Claim 10, | 48 line 12) | "from" should read --front-- |
| 15 (Claim 13, | 4 line 4) | "fibs," should read --ribs,-- |
| 15 (Claim 18, | 24 line 3) | "from" should read --front-- |
| 16 (Claim 29, | 39 line 9) | "hid" should read --said-- |
| 16 (Claim 29, | 49 line 19) | "s rut" should read --a rear-- |

UNITED STATES PATENT AND TRADEMARK OFFICE
CERTIFICATE OF CORRECTION

PATENT NO. : 5,456,481
DATED : October 10, 1995
INVENTOR(S) : J.D. Allsop et al.

It is certified that error appears in the above-indentified patent and that said Letters Patent is hereby corrected as shown below:

Column 16, line 63, "from" should read —front—

Signed and Sealed this

Twenty-seventh Day of February, 1996

Attest:

BRUCE LEHMAN

Attesting Officer

Commissioner of Patents and Trademarks